US012621509B2

(12) United States Patent
Whitely et al.

(10) Patent No.: US 12,621,509 B2
(45) Date of Patent: *May 5, 2026

(54) SYSTEMS, METHODS, AND DEVICES FOR SELECTING SUPPLEMENTAL CONTENT

(71) Applicant: Comcast Cable Communications, LLC, Philadelphia, PA (US)

(72) Inventors: Christopher Paul Whitely, Summit, NJ (US); Zhao Xing, Livingston, NJ (US); Landy Eng, Jr., New York, NY (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/818,456

(22) Filed: Aug. 28, 2024

(65) Prior Publication Data

US 2024/0422367 A1     Dec. 19, 2024

Related U.S. Application Data

(63) Continuation of application No. 17/664,271, filed on May 20, 2022, now Pat. No. 12,120,363.

(60) Provisional application No. 63/202,000, filed on May 21, 2021.

(51) Int. Cl.
*H04N 21/234* (2011.01)
*H04N 21/258* (2011.01)
*H04N 21/262* (2011.01)

(52) U.S. Cl.
CPC . *H04N 21/23424* (2013.01); *H04N 21/25866* (2013.01); *H04N 21/26241* (2013.01)

(58) Field of Classification Search
CPC ................................................ H04N 21/23424
See application file for complete search history.

(56) References Cited

U.S. PATENT DOCUMENTS

| | | | | |
|---|---|---|---|---|
| 2014/0304726 A1* | 10/2014 | Hansen | .............. | G06Q 30/0201 |
| | | | | 725/14 |
| 2015/0051980 A1* | 2/2015 | Ge | ..................... | G06Q 30/0275 |
| | | | | 705/14.66 |
| 2021/0168416 A1* | 6/2021 | Weiner | ................. | H04N 21/235 |

OTHER PUBLICATIONS

US Patent Application filed on May 20, 2022, entitled "Systems, Methods, and Devices for Selecting Supplemental Content", U.S. Appl. No. 17/664,271.

* cited by examiner

*Primary Examiner* — Michael H Hong
(74) *Attorney, Agent, or Firm* — BakerHostetler

(57) ABSTRACT

A time associated with last selection of a content item at a user device may be determined. A time associated with a last user interaction with the user device may be determined. During presentation of the content item at the user device, it may be determined that a supplemental content insertion opportunity is available. A request for a supplemental content item may be sent to a server, wherein the request comprises data indicating the time associated with the last selection of the content item at the user device and data indicating the time associated with the last user interaction with the user device.

50 Claims, 7 Drawing Sheets

Figure 2:
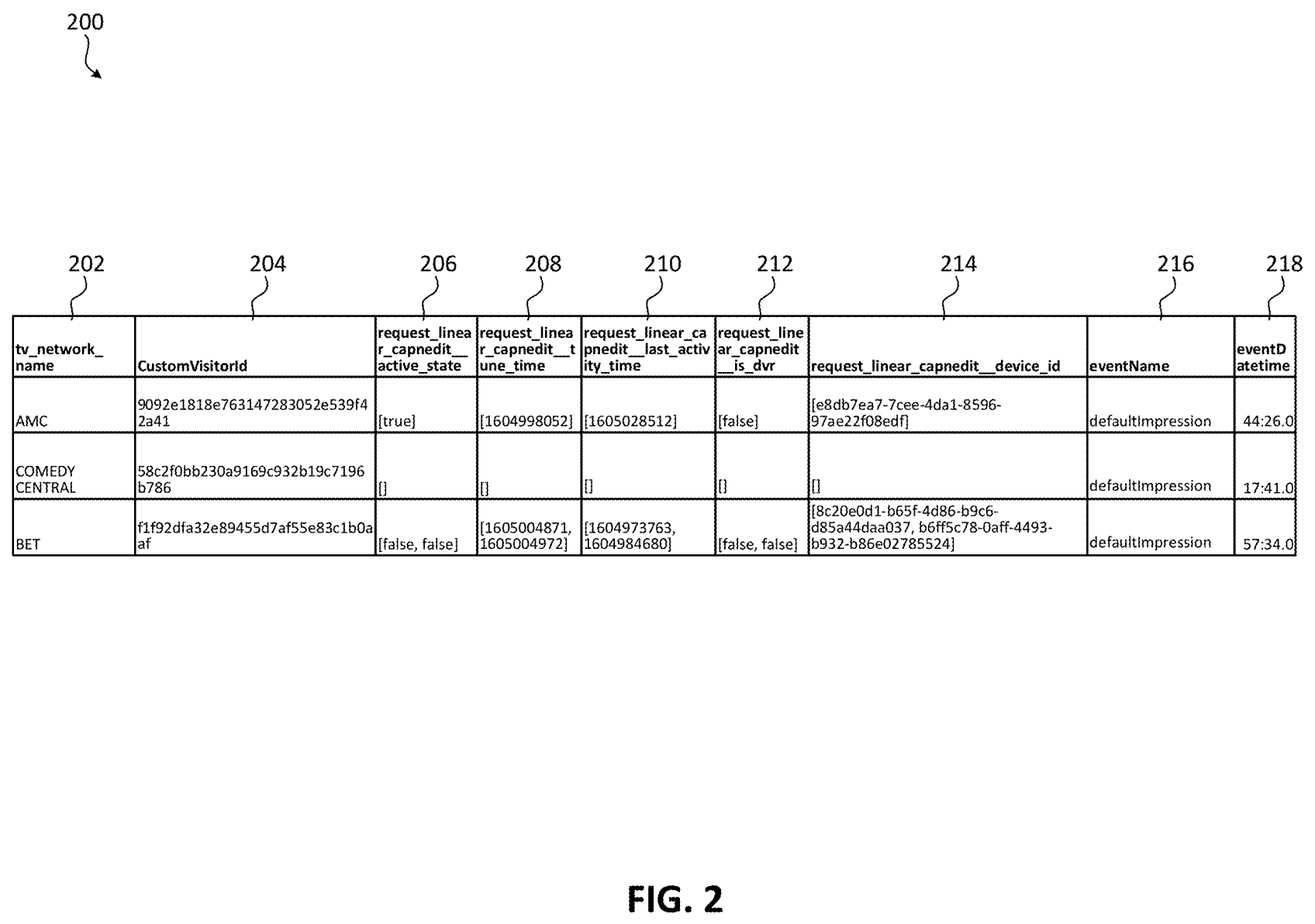

200

| tv_network_name (202) | CustomVisitorId (204) | request_linear_capnedit_active_state (206) | request_linear_capnedit_tune_time (208) | request_linear_capnedit_last_activity_time (210) | request_linear_capnedit_is_dvr (212) | request_linear_capnedit_device_id (214) | eventName (216) | eventDatetime (218) |
|---|---|---|---|---|---|---|---|---|
| AMC | 9092e1818e76314728305 2e539f4 2a41 | [true] | [1604998052] | [1605028512] | [false] | [e8db7ea7-7cee-4da1-8596-97ae22f08edf] | defaultImpression | 44:26.0 |
| COMEDY CENTRAL | 58c2f0bb230a9169c932b19c7196 b786 | [] | [] | [] | [] | [] | defaultImpression | 17:41.0 |
| BET | f1f92dfa32e89945d7af55e83c1b0a af | [false, false] | [1605004871, 1605004972] | [1604973763, 1604984680] | [false, false] | [8c20e0d1-b65f-4d86-b9c6-d85a44daa037, b6ff5c78-0aff-4493-b932-b86e02785524] | defaultImpression | 57:34.0 |

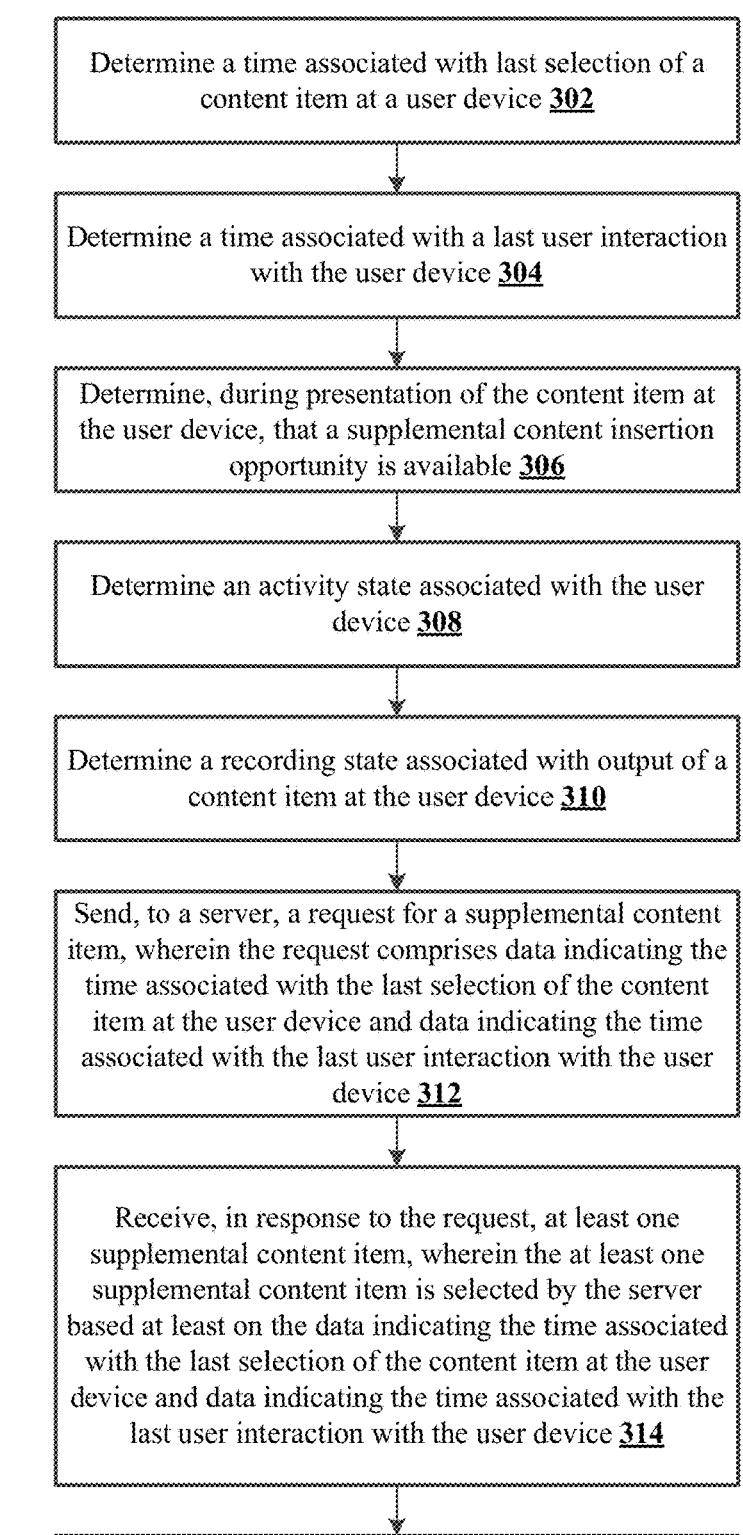

Determine a time associated with last selection of a content item at a user device 302

Determine a time associated with a last user interaction with the user device 304

Determine, during presentation of the content item at the user device, that a supplemental content insertion opportunity is available 306

Determine an activity state associated with the user device 308

Determine a recording state associated with output of a content item at the user device 310

Send, to a server, a request for a supplemental content item, wherein the request comprises data indicating the time associated with the last selection of the content item at the user device and data indicating the time associated with the last user interaction with the user device 312

Receive, in response to the request, at least one supplemental content item, wherein the at least one supplemental content item is selected by the server based at least on the data indicating the time associated with the last selection of the content item at the user device and data indicating the time associated with the last user interaction with the user device 314

Insert the at least one supplemental content item into the content item at a time associated with the supplemental content insertion opportunity 316

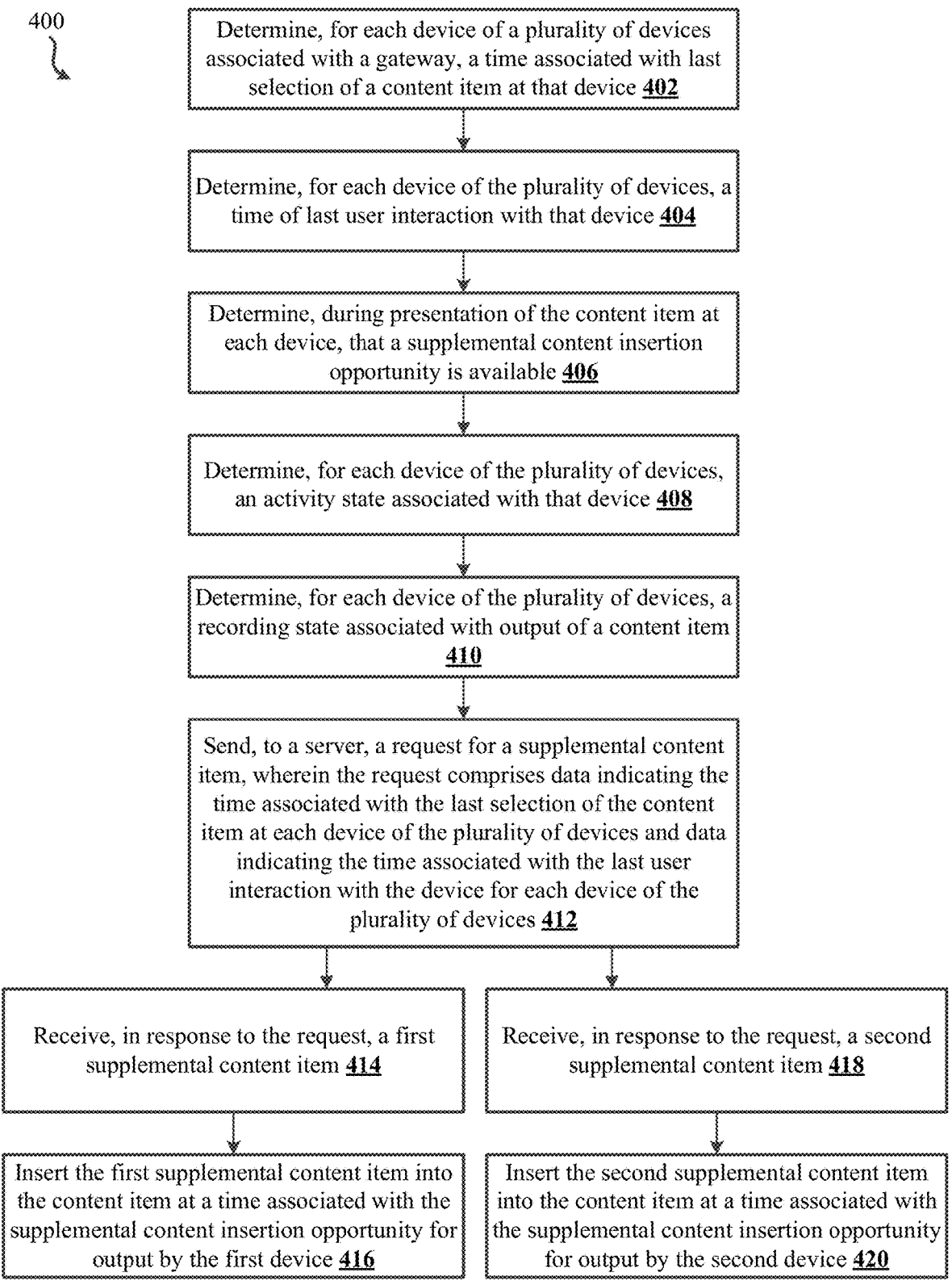

Determine, for each device of a plurality of devices associated with a gateway, a time associated with last selection of a content item at that device 402

Determine, for each device of the plurality of devices, a time of last user interaction with that device 404

Determine, during presentation of the content item at each device, that a supplemental content insertion opportunity is available 406

Determine, for each device of the plurality of devices, an activity state associated with that device 408

Determine, for each device of the plurality of devices, a recording state associated with output of a content item 410

Send, to a server, a request for a supplemental content item, wherein the request comprises data indicating the time associated with the last selection of the content item at each device of the plurality of devices and data indicating the time associated with the last user interaction with the device for each device of the plurality of devices 412

Receive, in response to the request, a first supplemental content item 414

Receive, in response to the request, a second supplemental content item 418

Insert the first supplemental content item into the content item at a time associated with the supplemental content insertion opportunity for output by the first device 416

Insert the second supplemental content item into the content item at a time associated with the supplemental content insertion opportunity for output by the second device 420

Receive data indicating a time associated with last selection of a content item at a user device and data indicating a time associated with a last user interaction with the user device 602

↓

Receive, during presentation of the content item at the user device, a request for a supplemental content item for insertion into an available supplemental content insertion opportunity 604

↓

Adding, to the request, the data indicating the time associated with the last selection of the content item at the user device, the data indicating the time associated with the last user interaction with the user device, and the data indicating the time associated with the available supplemental content insertion opportunity 606

↓

Receive at least one supplemental content item, wherein the at least one supplemental content item is selected by the server based at least on the data indicating the time associated with the last selection of the content item at the user device and the data indicating the time associated with the last user interaction with the user device 608

↓

Forward the at least one supplemental content item for insertion into the content item at a time associated with the supplemental content insertion opportunity 610

FIG. 6

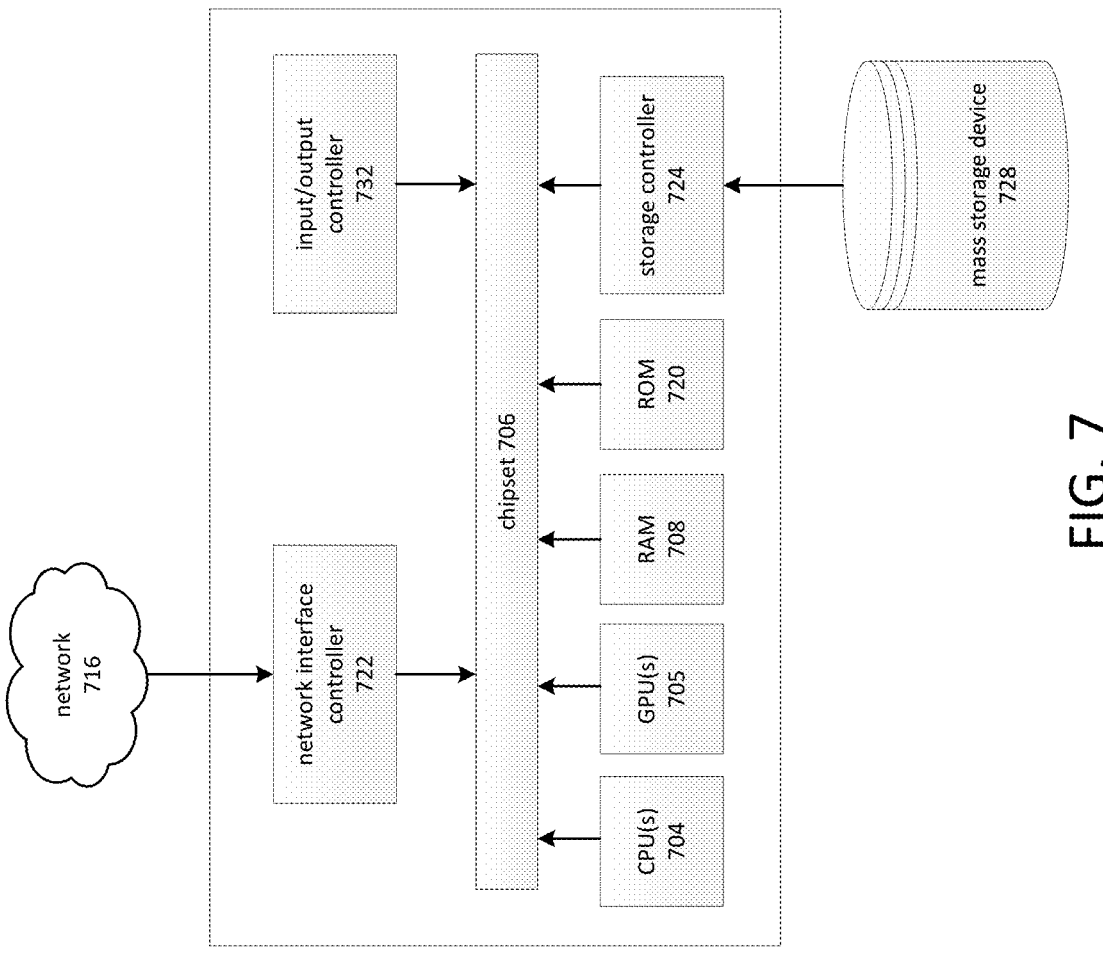
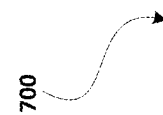
FIG. 7

SYSTEMS, METHODS, AND DEVICES FOR SELECTING SUPPLEMENTAL CONTENT

CROSS-REFERENCE TO RELATED APPLICATIONS

This application is a continuation of U.S. patent application Ser. No. 17/664,271, filed May 20, 2022, now U.S. Pat. No. 12,120,363, issued Oct. 15, 2024, which claims priority to and is a non-provisional of U.S. Provisional Patent Application No. 63/202,000, filed May 21, 2021, each of which is hereby incorporated by reference in its entirety.

BACKGROUND

Household addressable media networks, such as cable and satellite television networks, allow network operators to provide specific content to target households. For example, an advertiser may be able to send one version of a supplemental content item (e.g. an advertisement) to a first segment of households and another version of the supplemental content item to a second segment of households. However, sending addressable supplemental content may be more expensive than sending generic, non-addressable supplemental content. An advertiser may not want to send a more expensive addressable supplemental content item to a household if a user is not actually viewing the content. Therefore, improvements in supplemental content selection techniques are needed.

SUMMARY

Systems, methods, and devices relating to supplemental content selection are described herein. Supplemental content may be selected based on whether a user is viewing the content item in which the supplemental content may be inserted. A request for one or more supplemental content items for insertion into an available supplemental content insertion opportunity in the content item may be generated. The request may include data indicating the time associated with the last selection of the content item and data indicating a time of last user interaction with the user device. The request may be sent to a server. The request may be received by the server.

The information included in the request may be utilized to determine whether a user is viewing the content item. For example, the server may utilize the data indicating the time associated with the last selection of the content item and the data indicating the time associated with the last user interaction with the user device to determine whether a user is viewing the content item. If it is determined that a user is viewing the content item, one or more addressable, targeted supplemental content items may be selected for insertion into an available supplemental content insertion opportunity in the content item. If it is determined that a user is not viewing the content item, one or more non-addressable, non-targeted supplemental content items may be selected for insertion into an available supplemental content insertion opportunity in the content item. The selected item(s) of supplemental content may be sent back to the device that sent the request for insertion into the available supplemental content insertion opportunity in the content item.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF DRAWINGS

The accompanying drawings, which are incorporated in and constitute a part of this specification, illustrate embodiments and together with the description, serve to explain the principles of the systems, methods, and devices:

FIG. 2 shows an example set of requests for supplemental content.

FIG. 3 shows an example method.

FIG. 4 shows an example method.

FIG. 6 shows an example method.

FIG. 7 shows an example computing system.

Aspects of the disclosure will now be described in detail with reference to the drawings, wherein like reference numbers refer to like elements throughout, unless specified otherwise.

DETAILED DESCRIPTION

Figure 1:
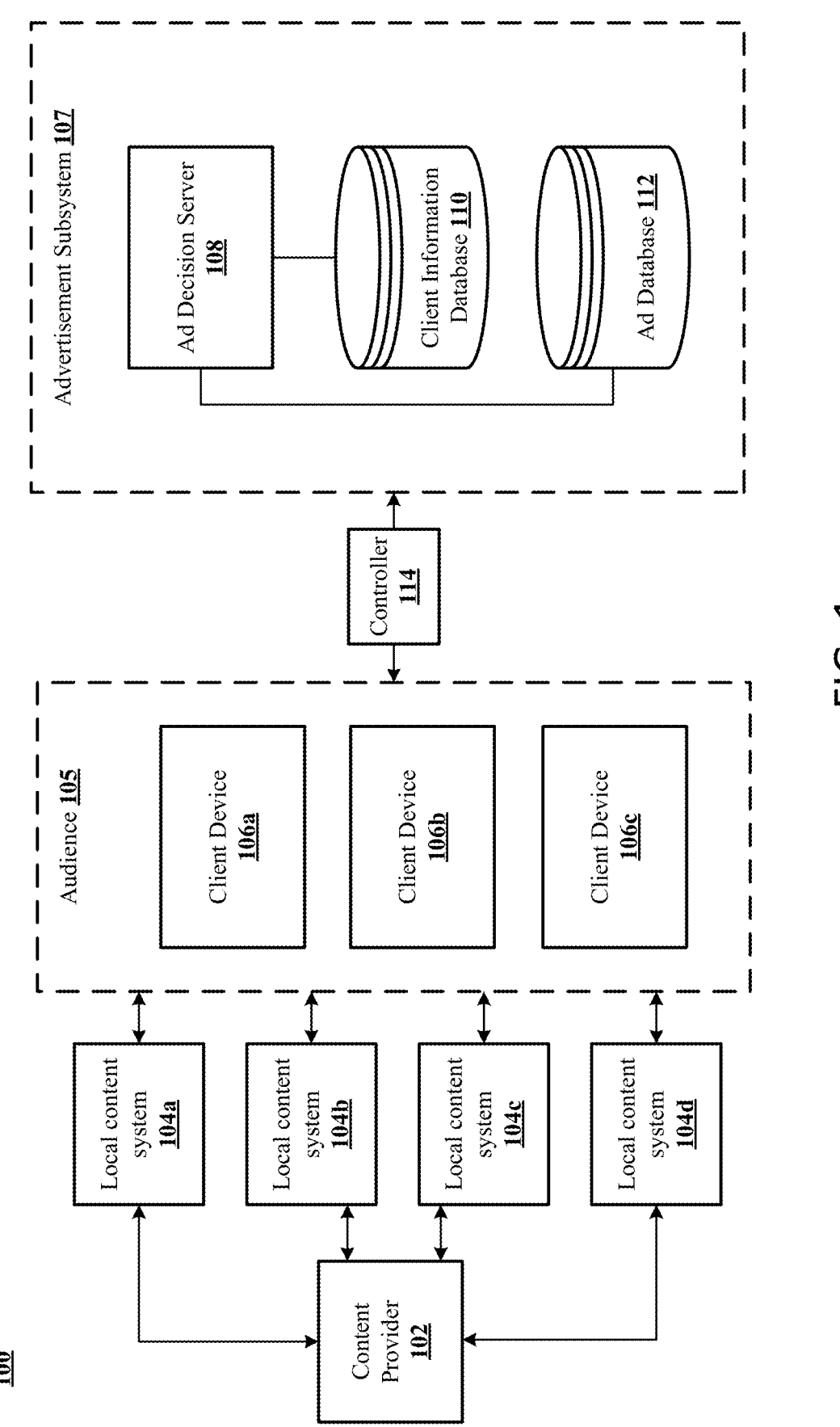
FIG. 1 shows a system.

Addressable advertising may be a highly effective form of advertising. For example, addressable advertising allows an advertiser to show different supplemental content items (e.g. advertisements) to different households and/or individuals while they are watching the same primary content item, such as a television show. Addressable advertising may be used to target specific individuals and/or specific households. For example, addressable supplemental content may be selected based on a household profile and/or various demographic criteria associated with an individual, such as age, gender, occupation, years of home ownership, household size, income, geographic location, family size, media consumption habits, and combinations thereof.

By targeting specific households and/or individuals, an advertiser may increase the likelihood that the end-viewer of the supplemental content item is actually interested in viewing the supplemental content. For example, the end-viewer of an addressable supplemental content item may be more likely to purchase or consume the goods or services being advertised by the supplemental content. By contrast, non-addressable advertising may be a less effective form of advertising. Non-addressable advertising may not be used to target specific individuals and/or specific households. For example, non-addressable advertising may show a generic supplemental content item to a large group of households and/or individuals, regardless of demographic information, identity, etc.

However, despite being more effective, addressable advertising may be more expensive than non-addressable advertising. For example, it may be more expensive for an advertiser to serve an addressable supplemental content item than a non-addressable supplemental content item. As a result, it may be desirable to serve addressable supplemental content items into a primary content item only when a user is actually watching the primary content item. It may be a waste of money to serve addressable supplemental content items into a primary content item if a user is not actually watching the primary content.

Accordingly, it may be desirable to determine whether a user is viewing a primary content item before selecting a supplemental content item for insertion into a supplemental content insertion opportunity in the primary content item.

This may be accomplished by including, in the request for the supplemental content item, information indicative of whether the request is coming from a device with no current users viewing. This information may include, for example, data indicating a time associated with last selection of the content item at the user device presenting the content item. The information may also include data indicating a time of last user interaction with the user device presenting the content item.

A server, such as an ad decision server, may receive the request and select one or more supplemental content items for insertion into the supplemental content insertion opportunity in the primary content item. For example, the server may determine, based on the information in the request, whether the request is coming from a device with no current users viewing. If it is determined that the request is coming from a device with current users viewing, one or more addressable supplemental content items may be selected. Conversely, if it is determined that the request is coming from a device with no current users viewing, one or more non-addressable supplemental content items may be selected. The selected supplemental content items, whether addressable or non-addressable, may be sent back to the device that sent the request. The selected supplemental content items may be inserted into the available supplemental content insertion opportunity in the primary content item.

The above described technique may provide multiple advantages over current supplemental content selection techniques. For example, the above described technique provides better and more efficient ad-decisioning for linear addressable advertisements. It also provides better forecasting of the total impressions for a given ad campaign. As a result, an advertiser may have a better idea, ahead of time, how far of a reach a particular ad campaign may have. The above described technique also provides the ability to distinguish which supplemental content items actually have viewers watching with greater precision.

FIG. 1 shows an example network in which the present systems, methods, and devices may be implemented. As shown in FIG. 1, a system 100 may comprise a content provider 102, one or more local content systems 104a-d, an audience 105, an advertisement subsystem 107, and a controller 114.

Non-limiting examples of a content provider 102 include a television broadcast network, a cable television network, a satellite television network, an internet service provider (ISP), a computing device advertising network, a media distribution network, a cloud computing network, a local area network (LAN), a wide area network (WAN), or any combination thereof. The content provider 102 may transmit content to one or more local content systems 104a-d configured to communicate with an audience 105 of the media network 100. The local content systems 104a-d may include equipment and systems configured to transmit content received from the content provider 102 to a defined portion of the audience 105. Illustrative and non-restrictive examples of a local content system 104a-d include a cable television network headend, an internet service provider base station, or the like.

The content transmitted by the content provider 102 may include one or more content items. A content item may comprise, as an example, a video program. A video program may refer generally to any video content produced for viewer consumption. A video program may comprise video content produced for broadcast via over-the-air radio, cable, satellite, or the internet. A video program may comprise video content produced for digital video streaming or videoon-demand. A video program may comprise a television show or program. A video program series may comprise two or more associated video programs. For example, a video program series may include an episodic or serial television series. As another example, a video program series may include a documentary series, such as a nature documentary series. As yet another example, a video program series may include a regularly scheduled video program series, such as a nightly news program.

The content transmitted by the content provider 102 may include supplemental content insertion markers (e.g. avail markers, cue messages, etc.). The supplemental content insertion markers may be, for example, timed metadata inserted into a stream of content. The supplemental content insertion markers may signal a supplemental content insertion opportunity (e.g. avail) in the stream of content. For example, a supplemental content insertion marker inserted into a stream of content may signal that a supplemental content item may be inserted into the stream at a particular timestamp. The supplemental content insertion marker inserted into a stream of content may additionally signal a duration that the inserted supplemental content item should have. The supplemental content insertion markers may be, for example, SCTE 35 markers in accordance with the American National Standards Institute (ANSI)/SCTE 35 standard. Additionally, or alternatively, the supplemental content insertion markers may be identified in XML with time codes associated with avail start and end times, and/or any other means of defining supplemental content insertion opportunity times.

Supplemental content may generally include any type of data capable of being received and consumed by a recipient. For example, supplemental content may include advertising, entertainment programs, informational programs, messages, video, audio, graphical, and/or animated content.

The content provider 102 may comprise a content source. The content source may provide (e.g., transmit or deliver) content, such as video programs, to the one or more local content systems 104a-d for delivery to the audience 105. The content source may comprise stored content, such as that anticipated to be delivered as digital streaming video, on-demand video, or cloud DVR recorded video. The content source may comprise content intended for immediate or near-immediate broadcast, such as a live television video feed. For example, the content source may comprise content that has not yet been broadcast or made available for digital video streaming or on-demand video delivery.

The content provider 102 and/or the local content systems 104a-d may be configured to implement linear addressable systems, such as a linear addressable television advertising system. In a linear addressable system, content and/or supplemental content may be targeted to individual user devices 106a-c, such as STBs, home gateways, and/or DVRs in a linear broadcast system.

The content provider 102 may be configured to operate across physical device platforms and networks simultaneously. For example, content may be delivered by the content provider 102 (such as via the one or more local content systems 104a-d) to set-top-boxes (STBs) and/or digital video recorders (DVRs) over a cable television system, to mobile computing devices using standard network communication protocols (for instance, Ethernet or Wi-Fi) over an ISP network, to smart phone devices over standard telecommunication protocols (for instance, third Generation (3G), fourth Generation (4G), long-term evolution (LTE), or the like), and to home gateway devices through a LAN, WAN and/or ISP network.

The audience 105 may include a plurality of user devices 106a-c capable of receiving content from the system 100 through various receiver devices. The plurality of user devices 106a-c may comprise any one of numerous types of devices configured to effectuate content output (e.g. play-back) and/or viewing. The plurality of user devices 106a-c may be configured to receive content and output the content to a separate display device for consumer viewing.

The plurality of user devices 106a-c may comprise a set-top box (STB), such as a cable STB. A STB may receive video content via a cable input (e.g., co-axial cable or fiber optic cable) and format the received video content for output to a display device. A STB may receive video content via digital video streaming. A STB (or other type of video device) may comprise a quadrature amplitude modulation (QAM) tuner. A STB may comprise a digital media player or a gaming device.

The plurality of user devices 106a-c may comprise a digital video recorder (DVR) that receives and stores video content for later viewing. A user device 106a-c may be in communication with a cloud DVR system to receive video content. A user device 106a-c may combine any features or characteristics of the foregoing examples. For instance, a user device 106a-c may include a cable STB with integrated DVR features.

The plurality of user devices 106a-c may comprise one or more of any other type of device, such as, and without limitation, a television, a personal computer (PC), a laptop computer, a mobile computing device, a smartphone, a tablet computing device, a home gateway, or the like.

The plurality of user devices 106a-c may detect supple-mental content insertion markers (e.g. avail markers, cue messages, etc.) in a content stream, such as a content stream received from the content source 102. As discussed above, the supplemental content insertion markers may be timed metadata inserted into a stream of content that signal a supplemental content insertion opportunity in a content stream. If the plurality of user devices 106a-c detect an insertion marker in a stream of content, the plurality of user devices 106a-c may send a request for a supplemental content item that may be inserted into the corresponding supplemental content insertion opportunity. For example, the plurality of user devices 106a-c may send a request for a supplemental content item to the ad decision server 108 of advertisement subsystem 107. The request may be transmit-ted using any suitable protocol.

The plurality of user devices 106a-c may receive supple-mental content items in response to the request. For example, the plurality of user devices 106a-c may receive one or more supplemental content items from the ad deci-sion server 108 in response to sending the request for the supplemental content item. The at least one supplemental content item may be transmitted to the plurality of user devices 106a-c using any suitable protocol.

The plurality of user devices 106a-c may insert one or more supplemental content items, such as those received from the ad decision server 108 in response to sending the request for the supplemental content item, into one or more supplemental content insertion opportunities in a content stream. For example, the plurality of user devices 106a-c may insert one or more supplemental content items into one or more supplemental content insertion opportunities in a content stream to create stitched playback content. The plurality of user devices 106a-c may insert one or more supplemental content items into one or more supplemental content insertion opportunities in a content stream using any type of advertising insertion or splicer architectures, whether analog, digital, or hybrid in nature.

Each of the plurality of user devices 106a-c may deter-mine when content has last been selected at that particular user device. For example, a content item may be selected when output of the content item is initiated. The content item may be selected, for example, when the user device is tuned to a channel or network configured to output the content item. For example, each of the plurality of user devices 106a-c may determine a time at which a user has initiated output of content via that particular user device. A user may initiate output of content, for example, by turning to a particular channel associated with the content provider 102 (e.g. a channel tune time). The time at which a user has initiated output of content may be the time at which the user initiated a stream of linear programming, such as linear cable television programming.

Each of the plurality of user devices 106a-c may deter-mine a time associated with a last user interaction with that particular user device. For example, each of the plurality of user devices 106a-c may determine a time at which a user has last interacted with that particular user device. A user may interact with each of the plurality of user devices 106a-c in a variety of different ways. A user may press/select a button that is included on a user device 106a-c and/or a button that is included on a remote-control device associated with the user device 106a-c. A user may send a command, such as a voice command, to the user device 106a-c and/or to a remote-control device associated with the user device 106a-c. The voice command may instruct the user device 106a-c to output certain content, adjust a volume associated with content output, or perform household tasks (e.g. lower your smart blinds, dim smart lights, change the color of your bulbs, etc.) The command may be sent to the user device 106a-c, for example, via an application installed on a mobile phone or tablet. User interaction may additionally, or alter-natively, include a change in a status of the user device 106a-c (e.g. television turns on and/or switches to a STB as active input).

Each of the plurality of user devices 106a-c may deter-mine an activity state associated with that particular device. For example, each of the plurality of user devices 106a-c may determine whether that particular user device is in an active state or an inactive state. A user device 106a-c may be in an inactive state if the user device is asleep and/or powered off. For example, a television or a STB may be in an inactive state if the television is powered off. A user device 106a-c may be in an active state if the user device is not in an inactive state (e.g. the user device is not asleep or powered off).

Each of the plurality of user devices 106a-c may deter-mine a recording state associated with output of content at that particular user device. For example, each of the plurality of user devices 106a-c may determine whether that particu-lar user device is outputting live content or recorded content. Recorded content may be, for example, content recorded and stored for later viewing by a DVR. Live content may be, for example, content that is not pre-recorded. For example, live content may be content that is being broadcast (aired) on television at the time of output. The plurality of user devices 106a-c may additionally determine that the output of content is being recorded while it is also being output live.

As discussed above, the plurality of user devices 106a-c may detect supplemental content insertion markers (e.g. avail markers, cue messages, etc.) in a content stream and may send a request for a supplemental content item that may be inserted into the corresponding supplemental content insertion opportunity. The request may include a variety of different information that may be used to select at least one supplemental content item for insertion into the supplemental content insertion opportunity. For example, the request may include one or more of data indicating a channel/ network, data indicating a time or duration of the supplemental content insertion opportunity, data indicating a user device identification number (user device ID), data indicating a time associated with last selection of the content item at the user device, data indicating a time of last user interaction with the user device, data indicating the activity state of the user device, data indicating the recording state of the output of the content, data indicating a time associated with the sending of the request, and/or any other information that may be helpful in selecting at least one supplemental content item for insertion into the supplemental content insertion opportunity.

The advertisement subsystem 107 may comprise at least one of an ad decision server 108, a client information database 110, and/or an ad database 112. The ad decision server 108 may select supplemental content based on information received from the plurality of user devices 106a-c. For example, the ad decision server 108 may receive a request for a supplemental content item from a user device 106a-c. The ad decision server 108 may use some or all of the information contained in the request to select one or more supplemental content items for insertion into the supplemental content insertion opportunity corresponding to the request. The ad decision server 108 may select one or more supplemental content items from supplemental content stored in the ad database 112. The supplemental content stored in the ad database 112 may be sent to the ad database 112 by a plurality of different sources, such as a plurality of different sources of advertisement (e.g. advertisers).

The ad decision server 108 may use some or all of the information contained in the request to select one or more addressable, targeted supplemental content items to be inserted into content output by the plurality of user devices 106a-c. As discussed above, addressable advertising is the ability to show different supplemental content items to different households while they are watching the same content. Addressable advertising may be used to target specific individuals (e.g. specific user devices 106a-c) and/ or specific households rather than a large group of anonymous third-party cookie pools. For example, the ad decision server 108 may select a first addressable, targeted supplemental content item to be inserted into content output by a first user device of the plurality of user devices 106a-c and may select a second, different addressable, targeted supplemental content item to be inserted into the same content output by a second user device of the plurality of user devices 106a-c.

The ad decision server 108 may select items of addressable supplemental content for insertion into a supplemental content insertion opportunity by a particular user device 106a-c based on information associated with that user device. For example, the ad decision server 108 may select items of addressable supplemental content based on a household profile associated with the user device, a profile associated with a user of the user device, and/or various demographic criteria associated with a user of the user device, such as age, gender, occupation, years of home ownership, household size, income, geographic location, family size, media consumption habits, and combinations thereof.

The ad decision server 108 may select items of addressable supplemental content for insertion into a supplemental content insertion opportunity by a particular user device 106a-c based on various segmentation factors. The plurality of user devices 106a-c may be divided into segments based on these various segmentation factors. Non-limiting examples of segmentation factors include age, gender, occupation, years of home ownership, household size, income, geographic location, family size, media consumption habits, and combinations thereof. For example, an audience segment may include males between the ages of 25 to 35 with an annual income above $50,000. For example, the ad decision server 108 may select particular supplemental content items for only certain segments of user devices 106a-c.

To select an item of addressable supplemental content for insertion into a supplemental content insertion opportunity by a user device 106a-c, the ad decision server 108 may utilize stored information associated with that user device 106a-c. The stored information may, for example, be stored in the client information database 110. The advertisement subsystem 107 may collect this information from the plurality of user devices 106a-c. The stored information may indicate a household profile associated with the user device, a profile associated with a user of the user device, and/or various demographic criteria associated with a user of the user device, such as age, gender, occupation, years of home ownership, household size, income, geographic location, family size, media consumption habits, and combinations thereof.

The ad decision server 108 may additionally, or alternatively, use some or all of the information contained in the request to select one or more non-addressable, non-targeted supplemental content items to be inserted into a supplemental content insertion opportunity by the plurality of user devices 106a-c. Unlike addressable, targeted supplemental content items, non-addressable, non-targeted supplemental content items are not targeted to specific user devices 106a-c, individuals, and/or households. Rather, non-addressable, non-targeted supplemental content items are output to a large group of user devices 106a-c, individuals, and/or households regardless of a household profile associated with the user device, a profile associated with a user of the user device, and/or various demographic criteria associated with a user of the user device. Non-addressable, non-targeted supplemental content items are viewed by whoever happens to be watching or listening during output. For example, the ad decision server 108 may select the same non-addressable, non-targeted supplemental content item to be inserted into the same or different content being output by more than one (or all) user devices of the plurality of user devices 106a-c.

The ad decision server 108 may use some or all of the information contained in the request to determine whether to select an addressable or a non-addressable supplemental content item for insertion into a supplemental content insertion opportunity. For example, the ad decision server 108 may use some or all of the information contained in the request to determine whether a user is actually viewing content being output by a user device 106a-c that sent the request. A user may not be viewing output content if, for example, the user has turned on the television and fallen asleep or walked out of the room. A user may also not be viewing output content if, for example, the user has turned off the television but left the STB on. The ad decision server 108 may determine that an addressable supplemental content item should be selected if it is determined that a user is viewing content being output by the user device 106a-c that sent the request. The ad decision server 108 may determine that a non-addressable supplemental content item should be selected if it is determined that a user is not actually viewing content being output by the user device 106a-c that sent the request.

The ad decision server 108 may determine whether a user is actually viewing content being output by a user device 106a-c based at least on the data indicating the time associated with last selection of the content item and the data indicating the time of last user interaction with the user device, as included in the request. For example, the ad decision server 108 may utilize the data indicating the time associated with last selection of the content item and the data indicating the time of last user interaction with the user device, along with a predetermined threshold, to determine whether a user is actually viewing content being output by a user device 106a-c.

If the time associated with the last selection of the content item or the time associated with the last user interaction with the user device is close enough to the time of the supplemental content insertion opportunity and/or the time of the request being sent, then the ad decision server 108 may determine that a user is actually watching the content being output by the user device 106a-c that sent the request. For example, if the time associated with the last selection of the content item or the time associated with the last user interaction with the user device is within a predetermined time frame, such as a certain amount of minutes or seconds, of the time of the supplemental content insertion opportunity and/or the time of the request being sent, this may indicate that the user is actually watching the content. If a user just turned to a channel, or just pressed a button on the remote control, this increases the likelihood that the user is still watching the content, and has not walked away from the user device 106a-c, fallen asleep, etc. Conversely, if a user turned to a channel a long time ago and has not interacted with the user device 106a-c for a long period of time, this increases the likelihood that the user is not actually watching the content. For example, the user may have walked away from the user device 106a-c, fallen asleep, etc.

To determine if the time associated with the last selection of the content item or the time associated with the last user interaction with the user device is close enough to the time of the supplemental content insertion opportunity and/or the time of the request being sent, the ad decision server 108 may compare a difference between the time of the supplemental content insertion opportunity and/or the time of the request being sent and the time associated with the last selection of the content item with a predetermined threshold. If the difference between the time of the supplemental content insertion opportunity and/or the time of the request being sent and the time associated with the last selection of the content item satisfies the predetermined threshold, a user may actually be watching the content being output by the user device 106a-c that sent the request.

The ad decision server 108 may additionally, or alternatively, compare a difference between the time of the supplemental content insertion opportunity and/or the time of the request being sent and the time associated with the last user interaction with the predetermined threshold. If the difference between the time of the supplemental content insertion opportunity and/or the time of the request being sent and the time associated with the last user interaction satisfies the predetermined threshold, a user may actually be watching the content being output by the user device 106a-c that sent the request.

If the neither the difference between the time of the supplemental content insertion opportunity and/or the time of the request being sent and the time associated with the last selection of the content item nor the difference between the time of the supplemental content insertion opportunity and/or the time of the request being sent and the time associated with the last user interaction satisfies the predetermined threshold, the user may not be watching the content being output by the user device 106a-c that sent the request.

The predetermined threshold may be a predetermined amount of time. For example, the predetermined threshold may be a predetermined number of minutes or seconds. The difference between the time of the supplemental content insertion opportunity and/or the time of the request being sent and the time associated with the last selection of the content item may satisfy the predetermined threshold if, for example, the difference between the time of the supplemental content insertion opportunity and/or the time of the request being sent and the time associated with the last selection of the content item is less than the predetermined number of minutes or seconds. This may occur, for example, if the user turned to a particular television channel at a first time, the supplemental content insertion opportunity and/or the time of request occurs at a second time, and the difference between the first time and the second time is less than the predetermined number of minutes or seconds.

Likewise, the difference between the time of the supplemental content insertion opportunity and/or the time of the request being sent and the time associated with the last user interaction may satisfy the predetermined threshold if, for example, the difference between the time of the supplemental content insertion opportunity and/or the time of the request being sent and the time associated with the last user interaction is less than the predetermined number of minutes or seconds. This may occur, for example, if the user initiated a voice command at a first time, the supplemental content insertion opportunity and/or the time of request occurs at a second time, and the difference between the first time and the second time is less than the predetermined number of minutes or seconds.

Conversely, the difference between the time of the supplemental content insertion opportunity and/or the time of the request being sent and the time associated with the last selection of the content item may not satisfy the predetermined threshold if, for example, the difference between the time of the supplemental content insertion opportunity and/or the time of the request being sent and the time associated with the last selection of the content item is equal to or greater than the predetermined number of minutes or seconds. This may occur, for example, if the user turned to a particular television channel at a first time, the supplemental content insertion opportunity and/or the time of request occurs at a second time, and the difference between the first time and the second time is equal to or greater than the predetermined number of minutes or seconds.

The difference between the time of the supplemental content insertion opportunity and/or the time of the request being sent and the time associated with the last user interaction may similarly fail to satisfy the predetermined threshold if, for example, the difference between the time of the supplemental content insertion opportunity and/or the time of the request being sent and the time associated with the last user interaction is greater than or equal to the predetermined number of minutes or seconds. This may occur, for example, if the user initiated a voice command at a first time, the supplemental content insertion opportunity and/or the time of request occurs at a second time, and the difference between the first time and the second time is greater than or equal to the predetermined number of minutes or seconds.

The predetermined threshold may be determined based at least in part on a "truth set." The "truth set" may be a set of viewership data indicative of viewers that have actually consumed a content item and/or a supplemental content item. To generate the "truth set," viewing data associated with the content item and/or the supplemental content item may be obtained from user devices, such as smart TVs, for a set of networks. The viewing data may be obtained using automatic content recognition (ACR) technology that only measures viewership when a TV set is on. The data obtained from the smart TVs may be scaled to account for missing devices in the household (e.g. devices not accounted for in the smart TV data). Common homes between set-top box data and smart TV data may be used to aid the scaling. This scaled smart TV data may be the "truth set."

To generate the predetermined threshold based on this "truth set," a set of other viewership data may also be used. The set of other viewership data may be, for example, set-top box viewership data. The set of other viewership data may indicate devices, such as STBs, that output a content item or a supplemental content item. The set of other viewership data may also indicate a time associated with last selection of a content item on each of the devices and a time associated with the last user interaction with each of the devices. The set of other viewership data may also indicate a time of the supplemental content insertion opportunity into which a supplemental content item was inserted and/or a time that a request for the supplemental content item was sent from the device.

This set of other viewership data may be adjusted so that it more closely resembles the "truth set." For example, this set of other viewership data may be adjusted so that it more accurately indicates viewers that have actually viewed the content item and/or the supplemental content item. To adjust this other viewership data so that it more closely resembles the "truth set," a set of expressions may be used. These expressions may include: "request time−TuneStart<threshold" and "request time-last activity time<threshold." The variable "request time" may be representative of the time of the supplemental content insertion opportunity and/or the time of the request for a supplemental content item being sent from the device. The variable "TuneStart" may be representative of the time associated with last selection of a content item at the device. The variable "last activity time" may be representative of the time associated with the last user interaction with the device.

If either of these expressions are satisfied for a particular device, then that a viewer associated with that device may have actually viewed the supplemental content item. The value for "threshold" in the set of expressions may continually be tweaked until the adjusted set of other viewership data more closely resembles the "truth set." For example, the optimal predetermined threshold may be calculated for the set-top box data set by comparing it to the scaled smart TV data (e.g. the "truth set"), minimizing the mean squared error, and then maximizing the fit via grid search.

The value of the predetermined threshold utilized by the ad decision server 108 may vary depending on time of day. Different predetermined threshold values may be calculated on an hourly basis by network type. For example, the value of the predetermined threshold may be different depending on whether the ad decision server 108 is selecting supplemental content items during prime time. Prime time (e.g. the peak time) is the block of broadcast programming that takes place during the middle of the evening for a television show. It is used by the major content providers to broadcast their season's nightly programming. Users may be more likely to be viewing content being output by the user device 106a-c during prime time. Accordingly, if the ad decision server 108 is selecting supplemental content items during prime time, the predetermined threshold may have a higher value than it may have during non-prime time. The predetermined threshold may have a higher value during prime time because the user is more likely to be watching prime time content, even if the user turned to the channel a long time ago or has not interacted with the user device for a long time.

The ad decision server 108 select different supplemental content for insertion into a supplemental content insertion opportunity in content that a user is watching than for insertion into a supplemental content insertion opportunity in content that a user is not actually watching. While addressable advertising may be a more effective form of advertising, addressable advertising also may be more expensive than non-addressable advertising. Accordingly, an advertiser may not want an addressable supplemental content item to be inserted into content if a user is not actually viewing the content. Accordingly, if the user is actually viewing content being output by a user device 106a-c that sent the request, the ad decision server 108 may select one or more addressable supplemental content items for insertion into the supplemental content insertion opportunity in the content stream. If the user is not actually viewing content being output by a user device 106a-c that sent the request, the ad decision server 108 may select one or more non-addressable supplemental content items for insertion into the supplemental content insertion opportunity in the content stream.

As described above, the client devices 106a-c of the audience 105 may be in direct communication with the advertisement subsystem 107. For example, the client devices 106a-c may be configured to send, to the ad decision server 108 of the advertisement subsystem 107, a request for a supplemental content item. The advertisement subsystem 107 may send back to the client devices 106a-c one or more supplemental content items in response to the request. Alternatively, or additionally, the controller 114 may sit in between the audience 105 and the advertisement subsystem 107. The controller 114 may monitor and/or cache data collected by the client devices 106a-c. For example, the controller 114 may monitor and/or cache, for each client device 106a-c, the data indicating the time associated with last selection of a content item at that particular client device, the data indicating the time of last user interaction with that particular client device, the data indicating the activity state associated with that device, the data indicating the recording state associated with that device, and/or any other type of data collected by the client devices 106a-c.

The controller 114 may receive, from a client device 106a-c, a request for a supplemental content item for insertion into an available supplemental content insertion opportunity. For example, the client device 106a-c may detect a supplemental content insertion opportunity and may, in response to detecting the insertion opportunity, send the request to the controller 114. The controller 114 may augment the request with the monitored and/or cached data associated with that client device 106a-c. For example, the controller 114 may augment the request with one or more of the data indicating the time associated with last selection of a content item at that particular client device, the data indicating the time of last user interaction with that particular client device, the data indicating the activity state associated with that device, or the data indicating the recording state associated with that device.

The controller 114 may forward the augmented request for a supplemental content item to the advertisement subsystem 107. The ad decision server 108 of the advertisement subsystem 107 may receive, from the controller 114, the augmented request for a supplemental content item. The ad decision server 108 may utilize the information in the augmented to request to select one or more supplemental content items for insertion into the supplemental content insertion opportunity. For example, the ad decision server 108 may utilize at least the data indicating the time associated with last selection of a content item at that particular client device and the data indicating the time of last user interaction with that particular client device to determine if a user is viewing the content item at the client device 106*a-c* associated with the request.

If the ad decision server 108 determines that a user is watching the content item, the ad decision server 108 may select one or more addressable supplemental content items. If the ad decision server 108 determines that a user is not watching the content item, the ad decision server 108 may select one or more non-addressable supplemental content items. The ad decision server 108 may forward the selected supplemental content items back to the controller 114. The controller 114 may forward the selected supplemental content items back to the client devices 106*a-c* for insertion into the supplemental content insertion opportunity.

FIG. 2 shows an example set of requests 200 for supplemental content. The exemplary set of requests 200 depicts three requests for supplemental content. Each of the rows in the exemplary set of requests 200 may be representative of an individual request for supplemental content. Each of the requests in the exemplary set of requests 200 may be sent from a user device (e.g. user device 106*a-c*) to a server (e.g. ad decision server 108). The user device may generate and send a request upon detecting a cue message or supplemental content insertion opportunity in a content stream. The server may receive each of the requests, and in response to each of the requests, select one or more supplemental content items for insertion into the corresponding supplemental content insertion opportunity. The server may send the selected one or more supplemental content items back to the device that sent the request. The user device may insert the one or more supplemental content items into the supplemental content insertion opportunity. Alternatively, the one or more supplemental content items may be inserted into the supplemental content insertion opportunity before being sent back to the user device.

Each of the requests in the exemplary set of requests 200 may include a variety of different data fields (e.g. flags). The data may include, for example, data indicating one or more of a network name 202, a visitor identification number 204, an activity state 206, a time associated with last selection of the content item at the user device 208, a time associated with the last user interaction with the user device 210, a recording state 212, a device identification 214, an event name 216, and/or an event date/time 218. Additional flags included in a request may indicate any other information that may be helpful in selecting at least one supplemental content item for insertion into the supplemental content insertion opportunity.

The first request depicted in the exemplary set of requests 200 (e.g. the first row in the chart) depicts a request associated with a first user device, such as a first STB. The first request includes data indicating a network name 202. For example, the first request includes data indicating that the first user device is tuned to the network "AMC" or the channel associated with the network "AMC." The first request includes data indicating visitor identification number 204. For example, the first request includes data indicating a hashed version of a gateway MAC address associated with the first user device. The first request includes data indicating an activity state 206. For example, the first request includes data indicating that the activity state of the first user device is "true." This may indicate that the first user device is active (e.g. not inactive). The first request includes data indicating a time associated with last selection of the content item at the user device 208. For example, the first request includes data indicating a time at which a user associated with the first user device tuned to "AMC."

The first request includes data indicating a time associated with the last user interaction with the user device 210. For example, the first request includes data indicating a time at which a user last interacted with the first user device (e.g. pressed a button, initiated a command, powered device on/off, etc.). The first request includes data indicating a recording state 212. For example, the first request includes data indicating that the recording state of the device is "false." This may indicate that the output of content on the first user device is live (e.g. not recorded). Conversely, data indicating that a recording state is "true" may indicate that output of content on that user device is recorded (e.g. not live).

The first request includes data indicating a device identification 214. For example, the first request includes an unhashed UUID associated with the first user device. The first request includes data indicating an event name 216. For example, the indication of the event name may be "defaultImpression." This may indicate only a portion of the selected item(s) of supplemental content needs to be viewed in order to be counted as an impression. Alternatively, the indication of the event name may indicate that the entire selected item(s) of supplemental content needs to be viewed in order to be counted as an impression. The first request includes data indicating an event time 218. For example, the first request includes data indicating that the time of request or the time of the avail occurs at the time of "44:26:0."

The server may receive the first request. The server may determine, using the flags included in the first request, whether a user is actually watching content on AMC on the first user device. For example, the server may utilize the data indicating the time associated with last selection of the content item at the user device 208 and the data indicating the time associated with the last user interaction with the user device 210 to determine if a user is actually watching content on AMC. In response to the first request, the server may select one or more supplemental content items for insertion into a supplemental content insertion opportunity corresponding to the request. For example, if the server determines that a user is actually watching content on AMC, the server may select one or more addressable, targeted supplemental content items. Conversely, if the server determines that a user is not actually watching content on AMC, the server may select one or more non-addressable, non-targeted supplemental content items. The server may send the selected one or more supplemental content items back to the first user device and the first user device may insert the one or more supplemental content items into the supplemental content insertion opportunity in the AMC content stream.

The second request depicted in the exemplary set of requests 200 (e.g. the second row in the chart) depicts a request associated with a second user device, such as a second STB. The second request includes data indicating a network name 202. For example, the second request includes data indicating that the second user device is tuned to the network "Comedy Central" or the channel associated with the network "Comedy Central." The second request includes data indicating a visitor identification number 204. For example, the second request includes data indicating a hashed version of a gateway MAC address associated with the second user device. The second request includes data indicating an event name 216. For example, the indication of the event name may be "defaultImpression." This may indicate only a portion of the selected item(s) of supplemental content needs to be viewed in order to be counted as an impression. Alternatively, the indication of the event name may indicate that the entire selected item(s) of supplemental content needs to be viewed in order to be counted as an impression. The second request includes data indicating an event time 218. For example, the second request includes data indicating that the time of request or the time of the avail occurs at the time of "17:41:0."

However, unlike the first request, the second request does not include data indicating an activity state 206, data indicating a time associated with last selection of the content item at the user device 208, data indicating a time associated with the last user interaction with the user device 210, data indicating a recording state 212, or data indicating a device identification 214. The second request may not include these flags because the second user device may not be configured to collect this information.

The server may still receive the second request. However, the server may not be able to determine, using the flags included in the first request, whether a user is actually watching content on Comedy Central on the second user device. For example, because the second request does not include the data indicating the time associated with last selection of the content item at the user device 208 or the data indicating the time associated with the last user interaction with the user device 210, the server may be unable to determine if a user is actually watching content on Comedy Central. The server may still select one or more supplemental content items for insertion into a supplemental content insertion opportunity associated with the request, but the one or more supplemental content items may be selected without regard to whether a user is actually watching content on Comedy Central. For example, the server may select one or more non-addressable supplemental content items for insertion into the supplemental content insertion opportunity.

The third request depicted in the exemplary set of requests 200 (e.g. the third row in the chart) depicts a request associated with a third user device, such as a third STB. However, unlike the first and second requests, the third request provides flags for more than one device connected to the third user device. For example, the third user device, such as a gateway device, may be connected to two different televisions in a household, and the third request may provide flags associated with both of these televisions. A request may include flags for any number of devices connected to a single user device (e.g. a single gateway device, etc.).

The third request includes data indicating a network name 202. For example, the third request includes data indicating that the third user device is tuned to the network "BET" or the channel associated with the network "BET." Accordingly, both devices connected to the third user device (such as the two televisions) may be tuned to BET. The third request includes data indicating visitor identification number 204. For example, the third request includes data indicating a hashed version of a gateway MAC address associated with the third user device. The third request includes data indicating an activity state 206 for each of the devices connected to the third user device. For example, the third request includes data indicating that the activity state of both of the devices connected to the third user device is "false." This may indicate that neither of the two devices are active (e.g. both are inactive). The third request includes data indicating a time associated with last selection of the content item at the user device 208 for each of the devices connected to the third user device. For example, the third request includes data indicating a time at which a user associated with each device connected to the third user device tuned to "AMC."

The third request includes data indicating a time associated with the last user interaction with the user device 210 for each of the devices connected to the third user device. For example, the third request includes data indicating a time at which a user last interacted with each of the devices connected to the third user device (e.g. pressed a button, initiated a command, powered device on/off, etc.). The third request includes data indicating a recording state 212 for each of the devices connected to the third user device. For example, the third request includes data indicating that the recording state of each of the devices connected to the third user device is "false." This may indicate that the output of content on each of the devices connected to the third user device is live (e.g. not recorded).

The third request includes data indicating a device identification 214 for each of the devices connected to the third user device. For example, the first request includes an unhashed UUID associated with each of the devices connected to the third user device. The third request includes data indicating an event name 216. For example, the indication of the event name may be "defaultImpression." This may indicate only a portion of the selected item(s) of supplemental content needs to be viewed in order to be counted as an impression. Alternatively, the indication of the event name may indicate that the entire selected item(s) of supplemental content needs to be viewed in order to be counted as an impression. The third request includes data indicating an event time 218. For example, the third request includes data indicating that the time of request occurs at the time of "57:34:0."

The server may receive the third request. The server may determine, using the flags included in the third request, whether a user is actually watching content on BET on either (or both) of the devices connected to the third user device. For example, the server may utilize the data indicating the time associated with the last selection of the content item at the user device 208 and the data indicating the time associated with the last user interaction with the user device 210 to determine if a user is actually watching content on BET on either (or both) of the devices connected to the third user device. The server may determine that a user is watching content on BET on one, all, or none of the devices connected to the third user device.

In response to the third request, and for each device connected to the third user device, the server may select one or more supplemental content items for insertion into a supplemental content insertion opportunity associated with the third request. For example, if the server determines that a user is actually watching content on BET on all of the devices connected to the third user device, the server may select one or more addressable, targeted supplemental content items for all of these devices. If the server determines that a user is actually watching content on one of the devices connected to the third user device but is not watching content on a different device connected to the third user device, the server may select one or more addressable, targeted supplemental content items for only the device on which the user is actually watching content. The server may select one or more items of non-addressable supplemental content for the device on which the user is not watching content. The server may send the selected one or more supplemental content items back to the third user device. The third user device may insert the one or more supplemental content items into the time slot in the BET content stream before output on the devices connected to the third user device.

FIG. 3 shows an example method 300 for selecting supplemental content. The method may be performed, for example, by a user device (e.g. a user device 106a-c). The method 300 may be performed to ensure that the appropriate type of supplemental content is inserted into content being output by the user device. For example, method 300 may be performed to ensure that addressable, targeted supplemental content is inserted into content being output (e.g. presented) by the user device when a user is actually viewing that content. The method 300 may be performed to ensure that non-addressable, non-targeted supplemental content is inserted into content being output by the user device when a user is not actually viewing that content. Accordingly, performance of the method 300 may ensure that the more expensive type of supplemental content (i.e. the addressable, targeted supplemental content) is inserted into content only when a user will actually view that supplemental content.

Information indicative of whether a user is viewing content being output by a user device may be collected or determined. This information may include content selection time(s) and user interaction time(s). This information may be collected, for example, periodically, such as every thirty minutes, every fifteen minutes, or any other time period. At 302, a time associated with last selection of a content item at a user device may be determined. For example, a time at which a user has initiated output of content may be determined. A user may initiate output of content, for example, by turning to a particular channel associated with the content provider. The time at which a user has initiated output of content may be the time at which the user initiated a stream of linear programming, such as linear cable television programming.

At 304, a time associated with a last user interaction with the user device may be determined. For example, a time at which a user has last interacted with the user device may be determined. User interaction may include any one of a variety of actions. To interact with the user device, a user may press/select a button that is included on a user device and/or a button that is included on a remote-control device associated with the user device. A user may send a command, such as a voice command, to the user device and/or to a remote-control device associated with the user device. The voice command may instruct the user device to output certain content, adjust a volume associated with content output, or perform household tasks (e.g. lower your smart blinds, dim smart lights, change the color of your bulbs, etc.). The command may be sent, for example, via an application installed on a mobile phone or tablet. User interaction may additionally, or alternatively, include a change in a status of the user device (e.g. television turns on and/or switches to a STB as active input).

A supplemental content insertion marker (e.g. avail marker, cue message, etc.) in a stream of a content item may be detected. At 306, a supplemental content insertion opportunity may be determined during presentation of the content item. As discussed above, the supplemental content insertion marker may be timed metadata inserted into a stream of content being output. The supplemental content insertion markers may signal a supplemental content insertion opportunity (e.g. an avail) in the content. For example, a supplemental content insertion marker inserted into a stream of content may signal that a supplemental content item may be inserted into the stream at a particular timestamp. The supplemental content insertion marker inserted into a stream of content may additionally signal a duration that the inserted supplemental content item should have. The supplemental content insertion markers may be, for example, SCTE 35 markers in accordance with the American National Standards Institute (ANSI)/SCTE 35 standard. Additionally, or alternatively, the supplemental content insertion markers may be identified in XML with time codes associated with avail insertion start and end times, and/or any other means of defining supplemental content insertion times.

A request for one or more supplemental content items for insertion into the supplemental content insertion opportunity may be generated. The generated request may, for example, resemble the first request depicted in FIG. 2. The request may include data indicating the time associated with last selection of the content item at the user device, as determined at 302. The request may also include data indicating a time associated with the last user interaction with the user device, as determined at 304.

The request may include other data as well. For example, the request may include data indicating an activity state of the user device. At 308, an activity state of the user device may be determined. The activity state of a user device may indicate whether that user device is in an active state or an inactive state. A user device may be in an inactive state if the user device is asleep and/or powered off. For example, a television or a STB may be in an inactive state if the television is powered off. A user device may be in an active state if the user device is not in an inactive state (e.g. the user device is not asleep or powered off).

The request may include data indicating a recording state associated with output of the content item. At 310, a recording state associated with output of the content item may be determined. The recording state may indicate whether the user device is outputting live content or recorded content. Recorded content may be, for example, content recorded and stored for later viewing by a DVR. Live content may be, for example, content that is not pre-recorded. For example, live content may be content that is being broadcast (aired) on television at the time of output.

The request may include other information. For example, the request may include one or more of data indicating a network name, data indicating a visitor identification number, data indicating a device identification, data indicating an event name, data indicating an event date/time, or data indicating any other information that may be helpful in selecting at least one supplemental content item for insertion into the supplemental content insertion opportunity.

The request may be sent to a server, such as the ad decision server 108. At 312, the request may be sent to the server. The server may receive the request and may select one or more supplemental content items for insertion into the supplemental content insertion opportunity based on some or all of the information contained in the request. For example, the server may use some or all of the information contained in the request to determine whether to select an addressable or a non-addressable supplemental content item for insertion into the supplemental content insertion opportunity. For example, the server may use some or all of the information contained in the request to determine whether a user is actually viewing the content item. A user may not be viewing the content item if, for example, the user has turned on the television and fallen asleep or walked out of the room. A user may also not be viewing output content if, for example, the user has turned off the television but left the STB on. The server may select an addressable supplemental content item if it is determined that a user is actually viewing the content item. Conversely, the server may select a non-addressable supplemental content item if it is determined that a user is not actually viewing the content item.

The server may determine whether a user is actually viewing the content item based at least on the data indicating the time associated with last selection of the content item at the user device and the data indicating the time associated with the last user interaction with the user device included in the request. For example, the server may utilize the data indicating the time associated with last selection of the content item at the user device and the data indicating the time associated with the last user interaction, along with a predetermined threshold, to determine whether a user is actually viewing the content item.

If the difference between the time of the supplemental content insertion opportunity and/or the time of the request being sent and the time associated with last selection of the content item at the user device satisfies the predetermined threshold, a user may actually be watching the content item. Likewise, if the difference between the time of the supplemental content insertion opportunity and/or the time of the request being sent and the time associated with the last user interaction with the user device satisfies the predetermined threshold, a user may actually be watching the content item.

Conversely, if the neither the difference between the time of the supplemental content insertion opportunity and/or the time of the request being sent and the time associated with last selection of the content item at the user device nor the difference between the time of the supplemental content insertion opportunity and/or the time of the request being sent and the time associated with the last user interaction with the user device satisfies the predetermined threshold, the user may not be watching the content item.

The selected supplemental content, whether addressable or non-addressable, may be sent back to the user device. At 314, the at least one selected supplemental content item may be received in response to the request. The at least one supplemental content item may be inserted into the supplemental content insertion opportunity. At 316, the at least one supplemental content item may be inserted into the available supplemental content insertion opportunity in the content item. For example, the at least one supplemental content item may be inserted into one or more insertion opportunities in the content item to create stitched playback content. The one or more supplemental content items may be inserted into the one or more supplemental content insertion opportunities in the content item using any type of advertising insertion or splicer architectures, whether analog, digital, or hybrid in nature. The user may view the content stream, including the content item and the one or more inserted supplemental content items.

FIG. 4 shows an example method 400 for selecting supplemental content. The method may be performed, for example, by a user device (e.g. a user device 106a-c). The method 400 may be performed to ensure that the appropriate type of supplemental content is inserted into content being output by the user device. For example, method 400 may be performed to ensure that addressable, targeted supplemental content is inserted into content being output by the user device when a user is actually viewing that content. The method 400 may be performed to ensure that non-addressable, non-targeted supplemental content is inserted into content being output by the user device when a user is not actually viewing that content. Accordingly, performance of the method 400 may ensure that the more expensive type of supplemental content (i.e. the addressable, targeted supplemental content) is inserted into content only when a user will actually view that supplemental content.

A user device, such as a gateway device, may be connected to a plurality of household devices, such as televisions, tablets, computers, etc. The plurality of household devices may each be configured to output the same content stream at the same time. For example, two of the household devices of the plurality of household devices may output a television program on the same network at the same time.

Information indicative of whether a user is viewing content being output by each of a plurality of household devices may be collected or determined. This information may include content selection time(s) and user interaction time(s) for each of the plurality of household devices. This information may be collected, for example, periodically, such as every thirty minutes, every fifteen minutes, or any other time period. At 402, a time associated with last selection of a content item at each of the plurality of household devices may be determined. For example, a time at which a user has initiated output of the content item at each of the plurality of household devices may be determined. A user may initiate output of content, for example, by turning to a particular channel associated with the content provider. The time at which a user has initiated output of the content item may be the time at which the user initiated a stream of linear programming, such as linear cable television programming.

At 404, a time associated with a last user interaction with each of the plurality of household devices may be determined. For example, a time at which a user has last interacted with each of the plurality of household devices may be determined. User interaction may include any one of a variety of actions. To interact with the user device, a user may press/select a button that is included on a user device and/or a button that is included on a remote-control device associated with the user device. A user may send a command, such as a voice command, to the user device and/or to a remote-control device associated with the user device. The voice command may instruct the user device to output certain content, adjust a volume associated with content output, or perform household tasks (e.g. lower your smart blinds, dim smart lights, change the color of your bulbs, etc.). The command may be sent, for example, via an application installed on a mobile phone or tablet. User interaction may additionally, or alternatively, include a change in a status of the user device (e.g. television turns on and/or switches to a STB as active input).

A supplemental content insertion marker (e.g. avail marker, cue message, etc.) in a stream of a content item being output (e.g. presented) by each of the plurality of household devices may be detected. At 406, a supplemental content insertion marker may be detected. As discussed above, the insertion marker may be timed metadata inserted into a stream of content being output. The supplemental content insertion markers may signal a supplemental content insertion opportunity in the content item (e.g. an avail). For example, an insertion marker inserted into a stream of content may signal that a supplemental content item may be inserted into the stream at a particular timestamp. The insertion marker inserted into a stream of content may additionally signal a duration that the inserted supplemental content item should have. The supplemental content insertion markers may be, for example, SCTE 35 markers in accordance with the American National Standards Institute (ANSI)/SCTE 35 standard. Additionally, or alternatively, the supplemental content insertion markers may be identified in XML with time codes associated with supplemental content insertion opportunity insertion start and end times, and/or any other means of defining supplemental content insertion times.

A request for one or more supplemental content items for insertion into the supplemental content insertion opportunity may be generated. The generated request may, for example, resemble the third request depicted in FIG. 2. The request may include data indicating the time associated with last selection of the content item at each of the plurality of household devices, as determined at 402. The request may also include data indicating a time associated with the last user interaction with each of the plurality of household devices, as determined at 404.

The request may include other data as well. For example, the request may include data indicating an activity state of each of the plurality of household devices. At 408, an activity state of each of the plurality of household devices may be determined. The activity state of a household device may indicate whether that household device is in an active state or an inactive state. A household device may be in an inactive state if the household device is asleep and/or powered off. For example, a television or a STB may be in an inactive state if the television is powered off. A household device may be in an active state if the household device is not in an inactive state (e.g. the household device is not asleep or powered off).

The request may include data indicating a recording state associated with output of the content item at each of the plurality of household devices. At 410, a recording state associated with output of the content item each of the plurality of household devices may be determined. The recording state associated with a household device may indicate whether the household device is outputting live content or recorded content. Recorded content may be, for example, content recorded and stored for later viewing by a DVR. Live content may be, for example, content that is not pre-recorded. For example, live content may be content that is being broadcast (aired) on television at the time of output.

The request may include other information. For example, the request may include one or more of data indicating a network name, data indicating a visitor identification number, data indicating a device identification for each of the plurality of household devices, data indicating an event name, data indicating an event date/time, or data indicating any other information that may be helpful in selecting at least one supplemental content item for insertion into the supplemental content insertion opportunity.

The request may be sent to a server, such as the ad decision server 108. At 412, the request may be sent to the server. The server may receive the request and may select one or more supplemental content items for insertion into the supplemental content insertion opportunity based on some or all of the information contained in the request. The server may select different supplemental content items for insertion into the supplemental content insertion opportunity on different household devices of the plurality of household devices. For example, the server may select a first supplemental content item for insertion into the supplemental consent insertion opportunity at a first household device of the plurality of household devices and a second, different supplemental content item for insertion into the same supplemental content insertion opportunity on a second household device of the plurality of household devices.

The server may use some or all of the information contained in the request to determine whether to select an addressable or a non-addressable supplemental content item for each of the plurality of household devices. For example, the server may use some or all of the information contained in the request to determine whether a user is actually viewing content being output by each of the household devices. A user may not be viewing output content if, for example, the user has turned on the television and fallen asleep or walked out of the room. A user may also not be viewing output content if, for example, the user has turned off the television but left the STB on. The server may select one or more addressable supplemental content items for a household device of the plurality of household devices if it is determined that a user is actually viewing content being output by that household device. Conversely, the server may select one or more non-addressable supplemental content item if it is determined that a user is not actually viewing content being output by the household device.

It may be determined that a user is actually viewing the content item on all or none of the household devices of the plurality of household devices. If it is determined that a user is actually viewing the content item on all of the plurality of household devices, then one or more addressable supplemental content items may be selected for all of the plurality of household devices. If it is determined that a user is not viewing the content item on any of the plurality of household devices, then one or more non-addressable supplemental content items may be selected for all of the plurality of household devices.

Alternatively, it may be determined that a user is actually viewing the content item on a first household device of the plurality of household devices and that a user not viewing the content item on a second household device of the plurality of household devices. If it is determined that a user is actually viewing the content item on the first household device and that a user not viewing the content item on the second household device, one or more addressable supplemental content items may be selected for the first household device and one or more non-addressable supplemental content items may be selected for the second household device.

At 414, a first supplemental content item may be received in response to the request. The first supplemental content item may be selected based at least on the data associated with the first household device included in the request. For example, the first supplemental content item may be selected based on the data indicating the time associated with last selection of the content item at the first household device and the data indicating the time of last user interaction associated with the first household device. For example, it may be determined, based on the data indicating the time associated with last selection of the content item at the first household device and the data indicating the time of last user interaction associated with the first household device, that a user is actually viewing the content item at the first household device. If it is determined that a user is actually viewing the content item at first household device, the first supplemental content item that is received may include at least one addressable supplemental content item.

At 416, the first supplemental content item may be inserted into the available supplemental content insertion opportunity in the content item for output by the first household device. For example, the at least one supplemental content item may be inserted into one or more supplemental content insertion opportunities in the content item to create stitched playback content. The one or more supplemental content items may be inserted into the one or more supplemental content insertion opportunities in the content item using any type of advertising insertion or splicer architectures, whether analog, digital, or hybrid in nature. The user may view the content stream, including the content item and the one or more inserted supplemental content items.

At 416, a second supplemental content item may be received in response to the request. The second supplemental content item may be selected based at least on the data associated with the second household device included in the request. For example, the second supplemental content item may be selected based on the data indicating the time associated with last selection of the content item at the second household device and the data indicating the time of last user interaction associated with the second household device. For example, it may be determined, based on the data indicating the time associated with last selection of the content item at the second household device and the data indicating the time of last user interaction associated with the second household device, that a user is not actually viewing the content item at the second household device. If it is determined that a user is not actually viewing the content item at second household device, the second supplemental content item that is received may include at least one non-addressable supplemental content item.

At 418, the second supplemental content item may be inserted into the available supplemental content insertion opportunity in the content item for output by the second household device. For example, the at least one supplemental content item may be inserted into one or more supplemental content insertion opportunities in the content item to create stitched playback content. The one or more supplemental content items may be inserted into the one or more supplemental content insertion opportunities in the content item using any type of advertising insertion or splicer architectures, whether analog, digital, or hybrid in nature. The user may view the content stream, including the content item and the one or more inserted supplemental content items.

The method 400 described above shows that an addressable supplemental content item may be served to one receiver in a household and that a non-addressable supplemental content item may be served to a different receiver in the same household. Alternatively, a single supplemental content item may be determined for all household devices. For example, if a user is actually viewing the content item on a majority of household devices of a plurality of household devices, then an addressable supplemental content item may be determined for each household device of the plurality (even for those household devices that do not have a user actually viewing the content item). If a user is not actually viewing the content item on a majority of household devices of a plurality of household devices, then a non-addressable supplemental content item may be determined for each household device of the plurality (even for those household devices that do have a user actually viewing the content item).

Figure 5:
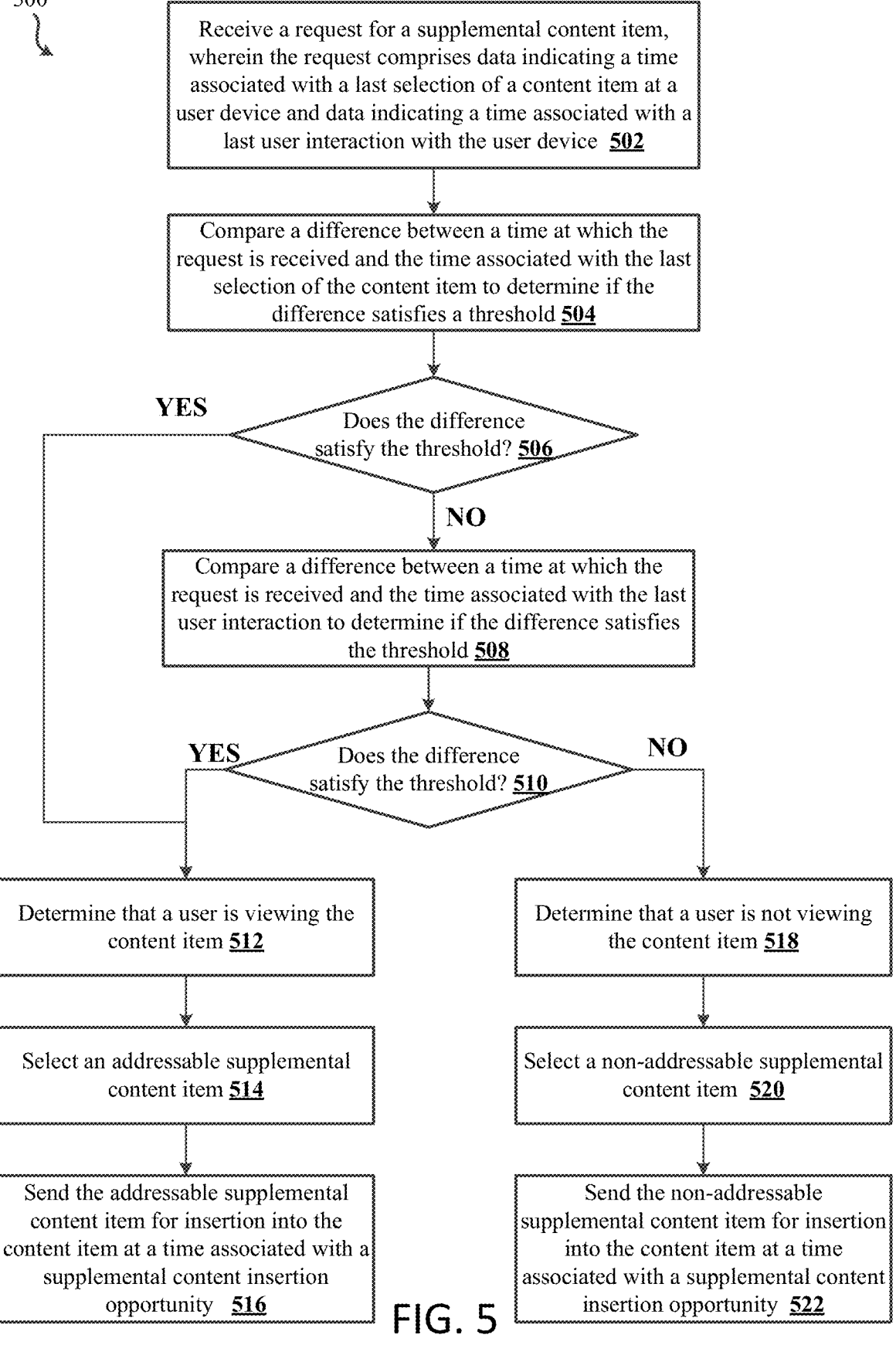
FIG. 5 shows an example method.

FIG. 5 shows an example method 500 for selecting supplemental content. The method may be performed, for example, by a server (e.g. ad decision server 108). The method 500 may be performed to ensure that the appropriate type of supplemental content is inserted into content being output by the user device. For example, method 500 may be performed to ensure that addressable, targeted supplemental content is inserted into content being output by a user device when a user is actually viewing that content. The method 500 may be performed to ensure that non-addressable, non-targeted supplemental content is inserted into content being output by a user device when a user is not actually viewing that content. Accordingly, performance of the method 500 may ensure that the more expensive type of supplemental content (i.e. the addressable, targeted supplemental content) is inserted into content only when a user will actually view that supplemental content.

A supplemental content insertion marker (e.g. avail marker, cue message, etc.) may be detected, such as by a user device. As discussed above, the supplemental content insertion marker may be timed metadata inserted into a stream of content being output. The supplemental content insertion markers may signal a supplemental content insertion opportunity in the content item (e.g. an avail). For example, a supplemental content insertion marker in a stream of content may signal that a supplemental content item may be inserted into the stream at a particular timestamp. The insertion marker inserted into a stream of content may additionally signal a duration that the inserted supplemental content item should have. The supplemental content insertion markers may be, for example, SCTE 35 markers in accordance with the American National Standards Institute (ANSI)/SCTE 35 standard. Additionally, or alternatively, the supplemental content insertion markers may be identified in XML with time codes associated with supplemental content insertion opportunity start and end times, and/or any other means of defining supplemental content insertion opportunity times.

A request for one or more supplemental content items for insertion into the supplemental content insertion opportunity may be generated, such as by a user device. The generated request may, for example, resemble any one of the requests depicted in FIG. 2. The request may include data indicating a time associated with a last selection of a content item at a user device. The time associated with the last selection of the content item may indicate a time at which a user turned to a particular channel associated with the content provider and/or the time at which a user initiated a stream of linear programming, such as linear cable television programming. The request may include data indicating a time associated with a last user interaction with the user device. The time associated with the last user interaction with the user device may be a time at which a user has last interacted with the user device. The request may include data indicating an activity state of the user device. The activity state of the user device may indicate whether that user device is in an active state or an inactive state. The request may include data indicating a recording state associated with output of the content. The recording state may indicate whether the user device is outputting live content or recorded content.

The request may additionally, or alternatively, include other information. For example, the request may include one or more of data indicating a network name, data indicating a visitor identification number, data indicating a device identification, an event name, an event date/time, or data indicating any other information that may be helpful in selecting at least one supplemental content item for insertion into the supplemental content insertion opportunity.

At 502, the request for one or more supplemental content items may be received. The request may be received and some or all of the information contained in the request may be used to select one or more supplemental content items for insertion into the supplemental content insertion opportunity corresponding to the request. For example, some or all of the information contained in the request may be used to determine whether to select an addressable or a non-addressable supplemental content item insertion into the supplemental content insertion opportunity.

To determine whether to select an addressable or a non-addressable supplemental content item, it may be determined whether a user is actually viewing the content item in which the supplemental content insertion opportunity is inserted. A user may not be viewing the content item if, for example, the user has turned on the television and fallen asleep or walked out of the room. A user may also not be viewing the content item if, for example, the user has turned off the television but left the STB on. If a user is actually viewing the content item, one or more addressable supplemental content items may be selected for insertion into the supplemental content insertion opportunity corresponding to the request. If a user is not actually viewing the content item, one or more non-addressable supplemental content items may be selected for insertion into the supplemental content insertion opportunity corresponding to the request.

Some or all of the information contained in the request may be used to determine whether a user is actually viewing the content item. For example, at least the data indicating the time associated with last selection of the content item at the user device and the data indicating the time associated with the last user interaction with the user device may be used to determine whether a user is actually viewing the content item.

If the time associated with last selection of the content item at the user device and/or the time associated with the last user interaction with the user device is close enough to the time of the supplemental content insertion opportunity and/or the time of the request being sent, then it may be determined that a user is actually watching the content item. For example, if the time associated with last selection of the content item at the user device and/or the time associated with the last user interaction with the user device is within a predetermined time frame, such as a certain amount of minutes or seconds, of the time of the supplemental content insertion opportunity and/or the time of the request being sent, this may indicate that the user is actually watching the content item. If a user just tuned in to a channel, or just pressed a button on the remote control, this increases the likelihood that the user is still watching the content, and has not walked away from the user device, fallen asleep, etc. Conversely, if a user tuned to a channel a long time ago and has not interacted with the user device for a long period of time, this increases the likelihood that the user is not actually watching the content. For example, the user may have walked away from the user device, fallen asleep, etc.

To determine if the time associated with last selection of the content item at the user device and/or the time associated with the last user interaction with the user device is close enough to the time of the supplemental content insertion opportunity and/or the time of the request being sent, a difference between the time of the supplemental content insertion opportunity and/or the time of the request being sent and the time associated with last selection of the content item at the user device may be compared with a predetermined threshold. At 504, the difference between the time of the supplemental content insertion opportunity or the time of the request being sent and the time associated with last selection of the content item at the user device may be compared to a predetermined threshold. The predetermined threshold may be a predetermined amount of time. For example, the predetermined threshold may be a predetermined number of minutes or seconds.

At 506, it may be determined whether the difference satisfies the predetermined threshold. The difference between the time of the supplemental content insertion opportunity and/or the time of the request being sent and the time associated with last selection of the content item at the user device may satisfy the predetermined threshold if, for example, the difference between the time of the supplemental content insertion opportunity and/or the time of the request being sent and the time associated with last selection of the content item at the user device is less than the predetermined number of minutes or seconds. This may occur, for example, if the user turned to a particular television channel at a first time, the supplemental content insertion opportunity and/or the time of request occurs at a second time, and the difference between the first time and the second time is less than the predetermined number of minutes or seconds. If the difference satisfies the predetermined threshold, this may indicate that the user is viewing the content item, and the method 500 may proceed to step 512.

The difference between the time of the supplemental content insertion opportunity or the time of the request being sent and the time associated with last selection of the content item at the user device may fail to satisfy the predetermined threshold if, for example, the difference between the time of the supplemental content insertion opportunity or the time of the request being sent and the time associated with last selection of the content item at the user device is greater than or equal to the predetermined number of minutes or seconds. If the difference does not satisfy the predetermined threshold, this may indicate that the user is not viewing the content item and the method 500 may proceed to step 508.

At 508, a difference between the time of the supplemental content insertion opportunity and/or the time of the request being sent and the time associated with the last user interaction with the user device may be compared with the predetermined threshold. At 510, it may be determined whether the difference between the time of the supplemental content insertion opportunity or the time of the request being sent and the time associated with the last user interaction with the user device satisfies the predetermined threshold. The difference between the time of the supplemental content insertion opportunity or the time of the request being sent and the time associated with the last user interaction with the user device may satisfy the predetermined threshold if, for example, the difference is less than the predetermined number of minutes or seconds. This may occur, for example, if the user initiated a voice command at a first time, the supplemental content insertion opportunity and/or the time of request occurs at a second time, and the difference between the first time and the second time is less than the predetermined number of minutes or seconds. If the difference satisfies the predetermined threshold, this may indicate that the user is viewing the content item and the method 500 may proceed to step 512.

The difference between the time of the supplemental content insertion opportunity or the time of the request being sent and the time associated with the last user interaction with the user device may fail to satisfy the predetermined threshold if, for example, the difference between the time of the supplemental content insertion opportunity or the time of the request being sent and time associated with the last user interaction with the user device is greater than or equal to the predetermined number of minutes or seconds. If the difference does not satisfy the predetermined threshold, this may indicate that the user is not viewing the content item and the method 500 may proceed to step 518.

At 512, it may be determined that a user is viewing the content item. One or more supplemental content items may be selected based on the determination that the user is viewing the content item. At 514, one or more addressable supplemental content items may be selected. The one or more addressable supplemental content items may be selected based on information associated with that user device. For example, the one or more addressable supplemental content items may be selected based on a household profile associated with the user device, a profile associated with a user of the user device, and/or various demographic criteria associated with a user of the user device, such as age, gender, occupation, years of home ownership, household size, income, geographic location, family size, media consumption habits, and combinations thereof.

The one or more addressable supplemental content items may be forwarded (e.g. sent), such as to the device that sent the request. At 516, the one or more addressable supplemental content items may be sent for insertion into an available supplemental content insertion opportunity in the content item. The at least one item of addressable supplemental content may be inserted into the available supplemental content insertion opportunity in the content item. For example, the at least one addressable supplemental content item may be inserted into one or more insertion opportunities in a content stream to create stitched playback content. The one or more addressable supplemental content items may be inserted into the one or more insertion opportunities in the content stream using any type of advertising insertion or splicer architectures, whether analog, digital, or hybrid in nature. The user may view the content stream, including the content item and the one or more inserted items of addressable supplemental content.

At 518, it may be determined that a user is not viewing the content item. One or more supplemental content items may be determined based on the determination that the user is not viewing the content item. At 520, one or more non-addressable supplemental content items may be selected. The one or more non-addressable supplemental content items may be forwarded (e.g. sent), such as to the device that sent the request. At 522, the one or more non-addressable supplemental content items may be sent for insertion into an available supplemental content insertion opportunity in the content item. The at least one item of non-addressable supplemental content may be inserted into the available supplemental content insertion opportunity in the content item. For example, the at least one non-addressable supplemental content item may be inserted into one or more insertion opportunities in a content stream to create stitched playback content. The one or more non-addressable supplemental content items may be inserted into the one or more insertion opportunities in the content stream using any type of advertising insertion or splicer architectures, whether analog, digital, or hybrid in nature. The user may view the content stream, including the content item and the one or more inserted items of non-addressable supplemental content.

As described above, a computing device (e.g. the controller 114) may sit in between the client devices (e.g. client devices 106a-c) and the advertisement subsystem (e.g. advertisement subsystem 107). FIG. 6 shows an example method 600 for selecting supplemental content. The method may be performed, for example, by a controller. The method 600 may be performed to ensure that the appropriate type of supplemental content is inserted into content being output by the user device. For example, method 600 may be performed to ensure that addressable, targeted supplemental content is inserted into content being output by a user device when a user is actually viewing that content. The method 600 may be performed to ensure that non-addressable, non-targeted supplemental content is inserted into content being output by a user device when a user is not actually viewing that content. Accordingly, performance of the method 600 may ensure that the more expensive type of supplemental content (i.e. the addressable, targeted supplemental content) is inserted into content only when a user will actually view that supplemental content.

Data collected by client devices may be monitored and/or cached. For example, data collected by the client devices may be monitored and/or cached periodically, such as every thirty minutes, every fifteen minutes, or any other time period. At 602, data collected by the client devices may be received. The data collected by the client devices may include, for example, data indicating the time associated with last selection of the content item at that particular client device, data indicating the time of last user interaction with that particular client device, data indicating the activity state associated with that device, data indicating the recording state associated with that device, and/or any other type of data collected by the client devices.

A supplemental content insertion marker (e.g. avail marker, cue message, etc.) may be detected, such as by a user device during presentation of a content item. As discussed above, the supplemental content insertion marker may be timed metadata inserted into a stream of content being output. The supplemental content insertion markers may signal a supplemental content insertion opportunity in the content item (e.g. an avail). For example, a supplemental content insertion marker in a stream of content may signal that a supplemental content item may be inserted into the stream at a particular timestamp. The insertion marker inserted into a stream of content may additionally signal a duration that the inserted supplemental content item should have. The supplemental content insertion markers may be, for example, SCTE 35 markers in accordance with the American National Standards Institute (ANSI)/SCTE 35 standard. Additionally, or alternatively, the supplemental content insertion markers may be identified in XML with time codes associated with supplemental content insertion opportunity start and end times, and/or any other means of defining supplemental content insertion opportunity times.

A request for one or more supplemental content items for insertion into the supplemental content insertion opportunity may be generated, such as by the user device. The user device may forward the request for one or more supplemental content items. At 604, the request for one or more supplemental content items for insertion into the supplemental content insertion opportunity may be received during presentation of the content item at the user device.

The request may be augmented with the cached data. At 606, at least the data indicating the time associated with last selection of the content item at that particular client device and the data indicating the time of last user interaction with that particular client device may be added to the received request. Any other cached data associated with the client device may additionally be added to the request. The augmented request may be forwarded to a server.

The server may receive the augmented request for a supplemental content item. The server may utilize the information in the augmented to request to select one or more supplemental content items for insertion into the supplemental content insertion opportunity. For example, the server may utilize at least the data indicating the time associated with last selection of the content item at that particular client device and the data indicating the time of last user interaction with that particular client device to determine if a user is viewing the content item at the client device associated with the request.

If the server determines that a user is watching the content item, the server may select one or more addressable supplemental content items. If the server determines that a user is not watching the content item, the server may select one or more non-addressable supplemental content items. The server may forward the selected supplemental content items. At 608, the at least one selected supplemental content item may be received. The at least one selected supplemental content item may be forwarded again for insertion into the supplemental content insertion opportunity. At 610, the at least one selected supplemental content item may be forwarded to the client device for insertion into the supplemental content insertion opportunity FIG. 7 shows an example computing device 700 that may represent any of the various devices or entities shown in FIG. 1, including, for example, the content provider 102, the local content system(s) 104a-d, the user devices 106a-c, the ad decision server 108, the client information database 110, the ad database 112, or the controller 114. That is, the computing device 700 shown in FIG. 6 may be any smartphone, server computer, workstation, access point, router, gateway, tablet computer, laptop computer, notebook computer, desktop computer, personal computer, network appliance, PDA, e-reader, user equipment (UE), mobile station, fixed or mobile subscriber unit, pager, wireless sensor, consumer electronics, or other computing device, and may be utilized to execute any aspects of the methods and apparatus described herein, such as to implement any of the apparatus of FIG. 1 or any of the methods described in relation to FIGS. 3-6.

The computing device 700 may include a baseboard, or "motherboard," which is a printed circuit board to which a multitude of components or devices may be connected by way of a system bus or other electrical communication paths. One or more central processing units (CPUs or "processors") 704 may operate in conjunction with a chipset 706. The CPU(s) 704 may be standard programmable processors that perform arithmetic and logical operations necessary for the operation of the computing device 700.

The CPU(s) 704 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 704 may be augmented with or replaced by other processing units, such as GPU(s) 705. The GPU(s) 705 may comprise processing units specialized for but not necessarily limited to highly parallel computations, such as graphics and other visualization-related processing.

A chipset 706 may provide an interface between the CPU(s) 704 and the remainder of the components and devices on the baseboard. The chipset 706 may provide an interface to a random-access memory (RAM) 708 used as the main memory in the computing device 700. The chipset 706 may provide an interface to a computer-readable storage medium, such as a read-only memory (ROM) 720 or non-volatile RAM (NVRAM) (not shown), for storing basic routines that may help to start up the computing device 700 and to transfer information between the various components and devices. ROM 720 or NVRAM may also store other software components necessary for the operation of the computing device 700 in accordance with the aspects described herein.

The computing device 700 may operate in a networked environment using logical connections to remote computing nodes and computer systems of the system 100. The chipset 706 may include functionality for providing network connectivity through a network interface controller (NIC) 722. A NIC 722 may be capable of connecting the computing device 700 to other computing nodes over the system 100. It should be appreciated that multiple NICs 722 may be present in the computing device 700, connecting the computing device to other types of networks and remote computer systems. The NIC may be configured to implement a wired local area network technology, such as IEEE 802.3 ("Ethernet") or the like. The NIC may also comprise any suitable wireless network interface controller capable of wirelessly connecting and communicating with other devices or computing nodes on the system 100. For example, the NIC 722 may operate in accordance with any of a variety of wireless communication protocols, including for example, the IEEE 802.11 ("Wi-Fi") protocol, the IEEE 802.16 or 802.20 ("WiMAX") protocols, the IEEE 802.15.4a ("Zigbee") protocol, the 802.15.3c ("UWB") protocol, or the like.

The computing device 700 may be connected to a mass storage device 728 that provides non-volatile storage (i.e., memory) for the computer. The mass storage device 728 may store system programs, application programs, other program modules, and data, which have been described in greater detail herein. The mass storage device 728 may be connected to the computing device 700 through a storage controller 724 connected to the chipset 706. The mass storage device 728 may consist of one or more physical storage units. A storage controller 724 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 700 may store data on a mass storage device 728 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 728 is characterized as primary or secondary storage and the like.

For example, the computing device 700 may store information to the mass storage device 728 by issuing instructions through a storage controller 724 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 700 may read information from the mass storage device 728 by detecting the physical states or characteristics of one or more particular locations within the physical storage units.

In addition to the mass storage device 728 described herein, the computing device 700 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 700.

By way of example and not limitation, computer-readable storage media may include volatile and non-volatile, non-transitory computer-readable storage media, and removable and non-removable media implemented in any method or technology. However, as used herein, the term computer-readable storage media does not encompass transitory computer-readable storage media, such as signals. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other non-transitory medium that may be used to store the desired information in a non-transitory fashion.

A mass storage device, such as the mass storage device 728 depicted in FIG. 7, may store an operating system utilized to control the operation of the computing device 700. The operating system may comprise a version of the LINUX operating system. The operating system may comprise a version of the WINDOWS SERVER operating system from the MICROSOFT Corporation. According to additional aspects, the operating system may comprise a version of the UNIX operating system. Various mobile phone operating systems, such as IOS and ANDROID, may also be utilized. It should be appreciated that other operating systems may also be utilized. The mass storage device 728 may store other system or application programs and data utilized by the computing device 700.

The mass storage device 728 or other computer-readable storage media may also be encoded with computer-executable instructions, which, when loaded into the computing device 700, transforms the computing device from a general-purpose computing system into a special-purpose computer capable of implementing the aspects described herein. These computer-executable instructions transform the computing device 700 by specifying how the CPU(s) 704 transition between states, as described herein. The computing device 700 may have access to computer-readable storage media storing computer-executable instructions, which, when executed by the computing device 700, may perform the methods described in relation to FIGS. 3-6.

A computing device, such as the computing device 700 depicted in FIG. 7, may also include an input/output controller 732 for receiving and processing input from a number of input devices, such as a keyboard, a mouse, a touchpad, a touch screen, an electronic stylus, or other type of input device. Similarly, an input/output controller 732 may provide output to a display, such as a computer monitor, a flat-panel display, a digital projector, a printer, a plotter, or other type of output device. It will be appreciated that the computing device 700 may not include all of the components shown in FIG. 7, may include other components that are not explicitly shown in FIG. 7, or may utilize an architecture completely different than that shown in FIG. 7.

As described herein, a computing device may be a physical computing device, such as the computing device 700 of FIG. 7. A computing device may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems described herein are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes¬ from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey data indicating a preferred or ideal embodiment. "Such as" is not used in a restrictive sense, but for explanatory purposes.

Components and devices are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable instructions (e.g., computer software or program code) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described above with reference to block diagrams and flowchart illustrations of methods, systems, apparatuses, and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are shown as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the shown computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A device comprising:

one or more processors; and memory storing instructions that, when executed by the one or more processors, cause the device to:

determine a time associated with last selection of a content item at a user device;

determine a time associated with a last user interaction with the user device;

determine, during presentation of the content item at the user device, that a supplemental content insertion opportunity is available;

send, to a server, a request for a supplemental content item, wherein the request comprises data indicating the time associated with the last selection of the content item at the user device and data indicating the time associated with the last user interaction with the user device.

2. The device of claim 1, wherein the instructions, when executed by the one or more processors, further cause the device to:

receive, in response to the request, at least one supplemental content item, wherein the at least one supplemental content item is selected by the server based at least on the data indicating the time associated with the last selection of the content item at the user device and the data indicating the time associated with the last user interaction with the user device.

3. The device of claim 1, wherein the instructions that, when executed by the one or more processors, cause the device to determine the time associated with last selection of the content item at a user device comprise instructions that, when executed by the one or more processors, cause the device to:

determine a time at which a user tuned to a channel configured to output the content item.

4. The device of claim 1, wherein the instructions that, when executed by the one or more processors, cause the device to determine the time associated with the last user interaction with the user device comprise instructions that, when executed by the one or more processors, cause the device to at least one of:

receive data indicating a button selection from a user;

receive data indicating a voice command from the user;

receive data indicating a command from an application; or receive data indicating a modification of a television status.

5. The device of claim 1, wherein the instructions, when executed by the one or more processors, further cause the device to:

determine an activity state associated with the user device, wherein the activity state is indicative of whether the user device is active or inactive, and wherein the request further comprises data indicating the activity state.

6. The device of claim 1, wherein the instructions, when executed by the one or more processors, further cause the device to:

determine a recording state associated with output of the content item, wherein the recording state is indicative of whether the output of the content item is a live output or a recording, and wherein the request further comprises data indicating the recording state.

7. The device of claim 1, wherein the content item comprises at least one of a linear cable television program, a digital streaming video, an on-demand video, or a digitally recorded video.

8. The device of claim 1, wherein the request further comprises data indicating a time associated with the supplemental content insertion opportunity.

9. The device of claim 1, wherein the supplemental content item comprises an advertisement.

10. The device of claim 2, wherein the instructions, when executed by the one or more processors, further cause the device to:

insert the at least one supplemental content item into the content item at a time associated with the supplemental content insertion opportunity.

11. A computer-readable medium storing instructions that, when executed, cause:

determining a time associated with last selection of a content item at a user device;

determining a time associated with a last user interaction with the user device;

determining, during presentation of the content item at the user device, that a supplemental content insertion opportunity is available;

sending, to a server, a request for a supplemental content item, wherein the request comprises data indicating the time associated with the last selection of the content item at the user device and data indicating the time associated with the last user interaction with the user device.

12. The computer-readable medium of claim 11, wherein the instructions, when executed, further cause:

receiving, in response to the request, at least one supplemental content item, wherein the at least one supplemental content item is selected by the server based at least on the data indicating the time associated with the last selection of the content item at the user device and the data indicating the time associated with the last user interaction with the user device.

13. The computer-readable medium of claim 11, wherein the instructions that, when executed, cause determining the time associated with last selection of the content item at a user device comprise instructions that, when executed, cause:

determining a time at which a user tuned to a channel configured to output the content item.

14. The computer-readable medium of claim 11, wherein the instructions that, when executed, cause determining the time associated with the last user interaction with the user device comprise instructions that, when executed, cause at least one of:

receiving data indicating a button selection from a user;

receiving data indicating a voice command from the user;

receiving data indicating a command from an application; or receiving data indicating a modification of a television status.

15. The computer-readable medium of claim 11, wherein the instructions, when executed, further cause:

determining an activity state associated with the user device, wherein the activity state is indicative of whether the user device is active or inactive, and wherein the request further comprises data indicating the activity state.

16. The computer-readable medium of claim 11, wherein the instructions, when executed, further cause:

determining a recording state associated with output of the content item, wherein the recording state is indicative of whether the output of the content item is a live output or a recording, and wherein the request further comprises data indicating the recording state.

17. The computer-readable medium of claim 11, wherein the content item comprises at least one of a linear cable television program, a digital streaming video, an on-demand video, or a digitally recorded video.

18. The computer-readable medium of claim 11, wherein the request further comprises data indicating a time associated with the supplemental content insertion opportunity.

19. The computer-readable medium of claim 11, wherein the supplemental content item comprises an advertisement.

20. The computer-readable medium of claim 12, wherein the instructions, when executed, further cause:

insert the at least one supplemental content item into the content item at a time associated with the supplemental content insertion opportunity.

21. A device comprising:

one or more processors; and memory storing instructions that, when executed by the one or more processors, cause the device to:

receive a request for a supplemental content item, wherein the request comprises data indicating a time associated with a last selection of a content item at a user device and data indicating a time associated with a last user interaction with the user device;

determine, in response to the request and based at least on the data indicating the time associated with the last selection of the content item at the user device and the data indicating a time associated with a last user interaction with the user device, at least one supplemental content item; and send the at least one supplemental content item for insertion into a supplemental content insertion opportunity in the content item.

22. The device of claim 21, wherein the instructions that, when executed by the one or more processors, cause the device to determine the at least one supplemental content item comprise instructions that, when executed by the one or more processors, cause the device to:

determine whether a difference between a time at which the request is received and the time associated with the last selection of the content item satisfies a threshold.

23. The device of claim 21, wherein the instructions that, when executed by the one or more processors, cause the device to determine the at least one supplemental content item comprise instructions that, when executed by the one or more processors, cause the device to:

determine whether a difference between a time at which the request is received and the time associated with the last user interaction with the user device satisfies a threshold.

24. The device of claim 21, wherein the time associated with the last selection of the content item at the user device comprises a time at which a user tuned to a channel configured to output the content item, and wherein the time associated with the last user interaction with the user device comprises at least one of data indicating a button selection from a user, data indicating a voice command from the user, data indicating a command from an application, or data indicating a modification of a television status.

25. The device of claim 21, wherein the instructions that, when executed by the one or more processors, cause the device to determine the at least one supplemental content item comprise instructions that, when executed by the one or more processors, cause the device to:

determine that a user is viewing the content item; and select an addressable supplemental content item.

26. The device of claim 21, wherein the instructions that, when executed by the one or more processors, cause the device to determine the at least one supplemental content item comprise instructions that, when executed by the one or more processors, cause the device to:

determine that a user is not viewing the content item; and select a non-addressable supplemental content item.

27. The device of claim 21, wherein the request further comprises data indicating a time associated with the supplemental content insertion opportunity, and wherein the device is configured to determine the at least one supplemental content item based on the data indicating the time associated with the supplemental content insertion opportunity.

28. The device of claim 21, wherein the content item comprises at least one of a linear cable television program, a digital streaming video, an on-demand video, or a digitally recorded video.

29. The device of claim 21, wherein the supplemental content item comprises an advertisement.

30. A computer-readable medium storing instructions that, when executed, cause:

receiving a request for a supplemental content item, wherein the request comprises data indicating a time associated with a last selection of a content item at a user device and data indicating a time associated with a last user interaction with the user device;

determining, in response to the request and based at least on the data indicating the time associated with the last selection of the content item at the user device and the data indicating a time associated with a last user interaction with the user device, at least one supplemental content item; and sending the at least one supplemental content item for insertion into a supplemental content insertion opportunity in the content item.

31. The computer-readable medium of claim 30, wherein the instructions that, when executed, cause determining the at least one supplemental content item comprise instructions that, when executed, cause:

determining whether a difference between a time at which the request is received and the time associated with the last selection of the content item satisfies a threshold.

32. The computer-readable medium of claim 30, wherein the instructions that, when executed, cause determining the at least one supplemental content item comprise instructions that, when executed, cause:

determining whether a difference between a time at which the request is received and the time associated with the last user interaction with the user device satisfies a threshold.

33. The computer-readable medium of claim 30, wherein the time associated with the last selection of the content item at the user device comprises a time at which a user tuned to a channel configured to output the content item, and wherein the time associated with the last user interaction with the user device comprises at least one of data indicating a button selection from a user, data indicating a voice command from the user, data indicating a command from an application, or data indicating a modification of a television status.

34. The computer-readable medium of claim 30, wherein the instructions that, when executed, cause determining the at least one supplemental content item comprise instructions that, when executed, cause:

determining that a user is viewing the content item; and selecting an addressable supplemental content item.

35. The computer-readable medium of claim 30, wherein the instructions that, when executed, cause determining the at least one supplemental content item comprise instructions that, when executed, cause:

determining that a user is not viewing the content item; and selecting a non-addressable supplemental content item.

36. The computer-readable medium of claim 30, wherein the request further comprises data indicating a time associated with the supplemental content insertion opportunity, and wherein the instructions that, when executed, cause determining the at least one supplemental content item comprise instructions that, when executed, cause determining the at least one supplemental content item based on the data indicating the time associated with the supplemental content insertion opportunity.

37. The computer-readable medium of claim 30, wherein the content item comprises at least one of a linear cable television program, a digital streaming video, an on-demand video, or a digitally recorded video.

38. The computer-readable medium of claim 30, wherein the supplemental content item comprises an advertisement.

39. A system comprising:
a user device;
a server device; and
a computing device configured to:

receive, from the user device, data indicating a time associated with last selection of a content item at the user device and data indicating a time associated with a last user interaction with the user device;

receive, from the user device during presentation of the content item at the user device, a request for a supplemental content item for insertion into an available supplemental content insertion opportunity;

add, to the request for the supplemental content item, the data indicating the time associated with the last selection of the content item at the user device and the data indicating the time associated with the last user interaction with the user device; and forward, to the server device, the request comprising the data indicating the time associated with the last selection of the content item at the user device and data indicating the time associated with the last user interaction with the user device.

40. The system of claim 39, wherein the time associated with the last selection of the content item at the user device comprises a time at which a user tuned to a channel configured to output the content item, and wherein the time associated with the last user interaction with the user device comprises at least one of data indicating a button selection from a user, data indicating a voice command from the user, data indicating a command from an application, or data indicating a modification of a television status.

41. The system of claim 39, wherein the computing device is further configured to:

receive, in response to the request, at least one supplemental content item, wherein the at least one supplemental content item is selected by the server device based at least on the data indicating the time associated with the last selection of the content item at the user device and the data indicating the time associated with the last user interaction with the user device; and forward, to the user device for insertion into the available supplemental content insertion opportunity, the at least one supplemental content item.

42. The system of claim 39, wherein the computing device is further configured to:

receive, from the user device, data indicating a time associated with the available supplemental content insertion opportunity; and add, to the request for the supplemental content item, the data indicating the time associated with the available supplemental content insertion opportunity.

43. The system of claim 39, wherein the content item comprises at least one of a linear cable television program, a digital streaming video, an on-demand video, or a digitally recorded video.

44. The system of claim 39, wherein the supplemental content item comprises an advertisement.

45. A computer-readable medium storing instructions that, when executed, cause:

receiving, from a user device, data indicating a time associated with last selection of a content item at the user device and data indicating a time associated with a last user interaction with the user device;

receiving, from the user device during presentation of the content item at the user device, a request for a supplemental content item for insertion into an available supplemental content insertion opportunity;

adding, to the request for the supplemental content item, the data indicating the time associated with the last selection of the content item at the user device and the data indicating the time associated with the last user interaction with the user device; and forwarding, to a server device, the request comprising the data indicating the time associated with the last selection of the content item at the user device and data indicating the time associated with the last user interaction with the user device.

46. The computer-readable medium of claim 45, wherein the time associated with the last selection of the content item at the user device comprises a time at which a user tuned to a channel configured to output the content item, and wherein the time associated with the last user interaction with the user device comprises at least one of data indicating a button selection from a user, data indicating a voice command from the user, data indicating a command from an application, or data indicating a modification of a television status.

47. The computer-readable medium of claim 45, wherein the instructions, when executed, further cause:

receiving, in response to the request, at least one supplemental content item, wherein the at least one supplemental content item is selected by the server device based at least on the data indicating the time associated with the last selection of the content item at the user device and the data indicating the time associated with the last user interaction with the user device; and forwarding, to the user device for insertion into the available supplemental content insertion opportunity, the at least one supplemental content item.

48. The computer-readable medium of claim 45, wherein the instructions, when executed, further cause:

receiving, from the user device, data indicating a time associated with the available supplemental content insertion opportunity; and adding, to the request for the supplemental content item, the data indicating the time associated with the available supplemental content insertion opportunity.

49. The computer-readable medium of claim 45, wherein the content item comprises at least one of a linear cable television program, a digital streaming video, an on-demand video, or a digitally recorded video.

50. The computer-readable medium of claim 45, wherein the supplemental content item comprises an advertisement.

* * * * *